United States Patent [19]
Danno et al.

[11] Patent Number: 5,649,180
[45] Date of Patent: Jul. 15, 1997

[54] METHOD FOR GENERATING HIERARCHICAL SPECIFICATION INFORMATION FROM SOFTWARE

[75] Inventors: Hirofumi Danno, Yamato; Ichiro Naito, Shibuya-ku; Gunji Tsukuda, Yokohama, all of Japan

[73] Assignee: Hitachi, Ltd., Tokyo, Japan

[21] Appl. No.: 339,467

[22] Filed: Nov. 14, 1994

[30] Foreign Application Priority Data

Nov. 19, 1993 [JP] Japan .................................. 5-290467

[51] Int. Cl.[6] ...................................................... G06F 17/00
[52] U.S. Cl. ..................... 395/601; 395/800; 364/DIG. 1
[58] Field of Search ................................. 395/600, 575, 395/400, 500, 650; 364/200

[56] References Cited

U.S. PATENT DOCUMENTS

| | | | |
|---|---|---|---|
| 4,677,550 | 6/1987 | Ferguson | 395/600 |
| 4,803,642 | 2/1989 | Muranaga | 395/62 |
| 4,813,010 | 3/1989 | Okamoto et al. | 395/600 |
| 4,967,348 | 10/1990 | Naito et al. | 364/200 |
| 5,287,488 | 2/1994 | Sakata et al. | 395/500 |
| 5,297,039 | 3/1994 | Kanaegami et al. | 395/63 |
| 5,305,450 | 4/1994 | Naito et al. | 395/500 |
| 5,369,778 | 11/1994 | San Soucie et al. | 395/800 |
| 5,410,696 | 4/1995 | Seki et al. | 395/650 |
| 5,430,873 | 7/1995 | Abe et al. | 395/650 |

FOREIGN PATENT DOCUMENTS 4-260925 9/1992 Japan .

OTHER PUBLICATIONS

Evans, Rosemary R., et al. *Reverse Engineering: Markets, Methods and Tools*, vol. 2, Ovum Ltd., 1990, pp. 27–36, (provided in English).

Richard W. Selby, "Analyzing Error–Prone System Structure," IEEE, Feb. 1991, vol. 17, No. 2, pp. 141–152.

Richard W. Selby, "Learning from examples: Generation and evaluation of decision tree for software resource analysis", IEEE, Dec. 1988, vol. 14, No. 12, pp. 1743–1757.

*Primary Examiner*—Thomas G. Black
*Assistant Examiner*—C. Pham
*Attorney, Agent, or Firm*—Fay, Sharpe, Beall, Fagan, Minnich & McKee

[57] ABSTRACT

The present invention is a method for extracting and generating hierarchical specification information in which the derivative of data included in already-developed software is hierarchically related and the reusability of data which is stored together with a relating procedure is high. In the method of the present invention, an existing program is analyzed and a data item and a procedure are extracted, and a procedure relating to a data item is stored in relation to the data item, and data items sharing a used area, data items for transferring data, or comparison items are stored as similar items in relation to each other, and key items are selected from the similar items, and a hierarchical specification in which the selected key items are set is generated, and dependent data items are selected from a record having the data items related to the key items, and the selected data items are added as attribute data of the hierarchical specification.

15 Claims, 25 Drawing Sheets

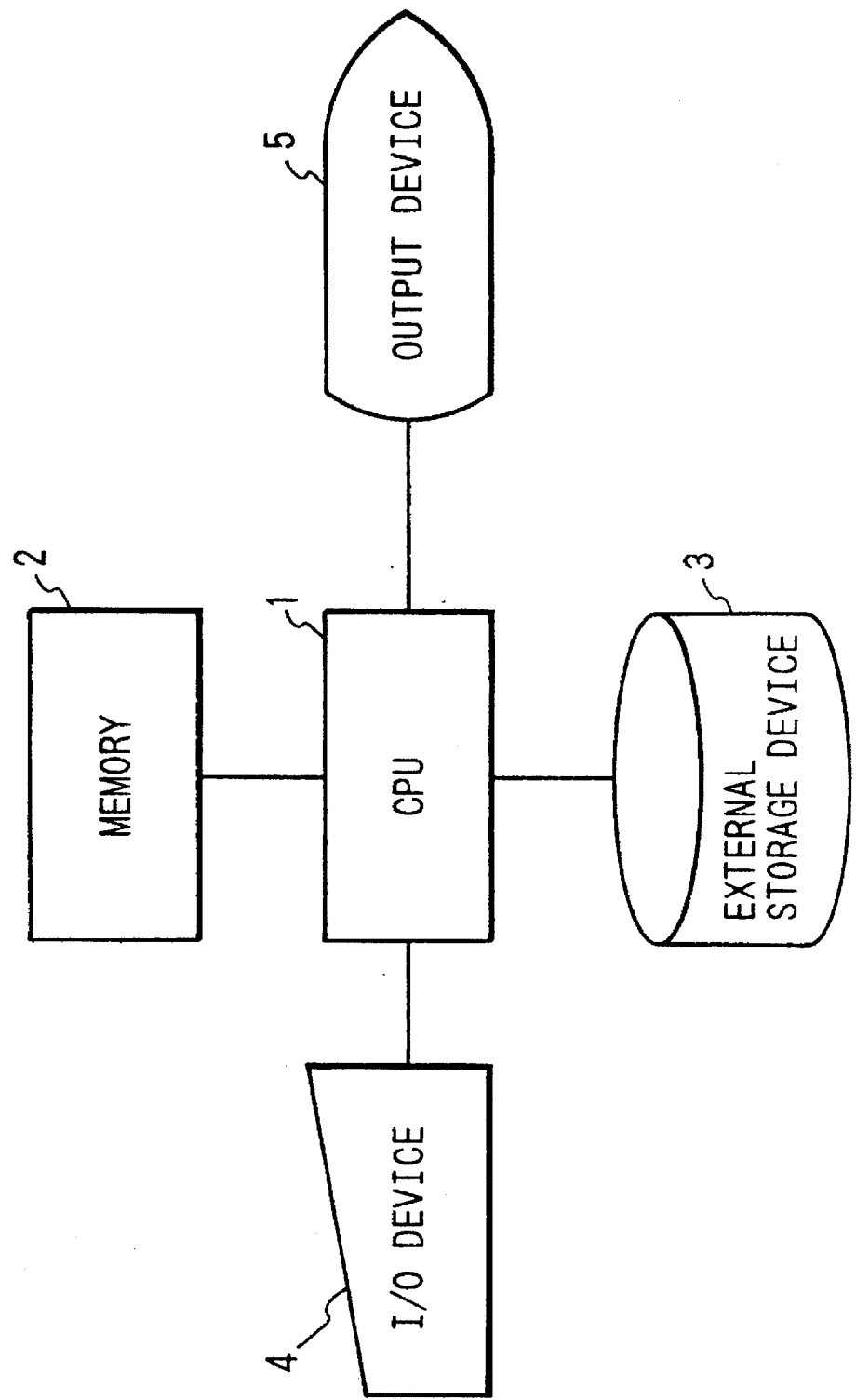

FIG. 3

```
PROGRAM-ID.  PROG001

SELECT  SLIP-FILE              ASSIGN  INPUT
SELECT  CLIENT-FILE            ASSIGN  REFER
SELECT  ORDER-RECEPTION-FILE   ASSIGN  OUTPUT

FD  SLIP-FILE                                  301         302
  01  SLIP-RECORD
    02  SLIP-NO                    PIC  9 (5) .
    02  SLIP-SERIAL-NO             PIC  X (5)   REDEF  SLIP-NO
    02  COMMODITY-NO               PIC  9 (3) .
    02  CLIENT-NO                  PIC  9 (5) .
    02  QUANTITY                   PIC  9 (4) .
    02  UNIT-PRICE                 PIC  9 (5) .
    02  AMOUNT                     PIC  9 (6) .

FD  ORDER-RECEPTION-FILE
  01  ORDER-RECEPTION-RECORD
    02  ORDER-RECEPTION-CODE       PIC  9 (5) .
    02  COMMODITY-CODE             PIC  9 (3) .
    02  CLIENT-CODE                PIC  9 (5) .
    02  CLIENT-NAME1               PIC  X (30) .
    02  QUANTITY-OF-RECEIVED-ORDER PIC  9 (4) .
    02  UNIT-PRICES-OF-RECEIVED-ORDER PIC 9 (5) .
    02  AMOUNT-OF-RECEIVED-ORDER   PIC  9 (6) .

FD  CLIENT-FILE
  01  CLIENT-RECORD
    02  CLIENT-SERIAL-NO           PIC  9 (5) .
    02  CLIENT-NAME                PIC  X (30) .
    02  ADDRESS                    PIC  X (30) .
    02  BUSINESS-CATEGORY-CODE     PIC  9 (4) .
```

FIG. 4

```
PROCEDURE DIVISION.

MOVE   0 TO AMOUNT-OF-RECEIVED-ORDER
   MOVE   SLIP-NO TO ORDER-RECEPTION-CODE
   MOVE   CLIENT-NO TO CLIENT-CODE

IF CLIENT-CODE = CLIENT-SERIAL-NO.
   THEN
     MOVE CLIENT-NAME TO CLIENT-NAME1 ──401

MOVE QUANTITY TO QUANTITY-OF-RECEIVED-ORDER
   MOVE UNIT-PRICE TO UNIT-PRICES-OF-RECEIVED-ORDER
   COMPUTE AMOUNT-OF-RECEIVED-ORDER = UNIT-PRICES-OF-RECEIVED-ORDER * QUANTITY-OF-RECEIVED-ORDER
```

| SERIAL NO | PARENT SERIAL NO | TITLE | ATTRIBUTE | DISPLACEMENT POSITION | LENGTH |
|---|---|---|---|---|---|
| 1 | 0 | PROG001 | PROGRAM | 0 | 0 |
| : | : | | | | |
| 5 | 1 | SLIP-FILE | FILE | 15 | 16 |
| 6 | 1 | CLIENT-FILE | FILE | 31 | 16 |
| 7 | 1 | ORDER-RECEPTION-FILE | FILE | 47 | 16 |
| : | : | | | | |
| 10 | 5 | SLIP-RECORD | RECORD | 120 | 28 |
| 11 | 10 | SLIP-NO | 9 | 120 | 5 |
| 12 | 10 | SLIP-SERIAL-NO | X | 120 | 5 |
| 13 | 10 | COMMODITY-NO | 9 | 125 | 3 |
| 14 | 10 | CLIENT-NO | 9 | 128 | 5 |
| 15 | 10 | QUANTITY | 9 | 133 | 4 |
| 16 | 10 | UNIT-PRICE | 9 | 137 | 5 |
| 17 | 10 | AMOUNT | 9 | 142 | 6 |
| 18 | 7 | ORDER-RECEPTION-RECORD | RECORD | 148 | 58 |
| 19 | 18 | ORDER-RECEPTION-CODE | 9 | 148 | 5 |
| 20 | 18 | COMMODITY-CODE | 9 | 153 | 3 |
| 21 | 18 | CLIENT-CODE | 9 | 156 | 5 |
| 22 | 18 | CLIENT-NAME1 | X | 161 | 30 |
| 23 | 18 | QUANTITY-OF-RECEIVED-ORDER | 9 | 191 | 4 |
| 24 | 18 | UNIT-PRICES-OF-RECEIVED-ORDER | 9 | 195 | 5 |
| 25 | 18 | AMOUNT-OF-RECEIVED-ORDER | 9 | 200 | 6 |
| 26 | 6 | CLIENT-RECORD | RECORD | 206 | 69 |
| 27 | 26 | CLIENT-SERIAL-NO | 9 | 275 | 5 |
| 28 | 26 | CLIENT-NAME | X | 280 | 30 |
| 29 | 26 | ADDRESS | X | 310 | 30 |
| 30 | 26 | BUSINESS-CATEGORY-CODE | 9 | 340 | 4 |

| SERIAL NO | COMMAND NAME | CONTENT OF COMMAND | PARENT SERIAL NO | NEXT SERIAL NO |
|---|---|---|---|---|
| | ⋮ | | | |
| 9 | MOVE | 0 TO AMOUNT-OF-RECEIVED-ORDER | 0 | 10 |
| 10 | MOVE | SLIP-NO TO ORDER-RECEPTION-CODE | 0 | 11 |
| 11 | MOVE | CLIENT-NO TO CLIENT-CODE | 0 | 12 |
| | ⋮ | | | |
| 30 | IF | CLIENT-CODE = CLIENT-SERIAL-NO | 0 | 35 |
| 31 | THEN | | 30 | 0 |
| 32 | MOVE | CLIENT-NAME TO CLIENT-NAME1 | 31 | 33 |
| | ⋮ | | | |
| 38 | MOVE | QUANTITY TO QUANTITY-OF-RECEIVED-ORDER | 0 | 39 |
| 39 | MOVE | UNIT-PRICE TO UNIT-PRICES-OF-RECEIVED-ORDER | 0 | 40 |
| 40 | COMPUTE | AMOUNT-OF-RECEIVED-ORDER = UNIT-PRICES-OF-RECEIVED-ORDER * QUANTITY-OF-RECEIVED-ORDER | 0 | 41 |
| | ⋮ | | | |

| SERIAL NO | PARENT SERIAL NO | TITLE | ATTRIBUTE | DISPLACEMENT POSITION | LENGTH | CREATION PROCEDURE |
|---|---|---|---|---|---|---|
| ⋮ | ⋮ | | | | | |
| 18 | 7 | ORDER-RECEPTION-RECORD | RECORD | 148 | 58 | |
| 19 | 18 | ORDER-RECEPTION-CODE | 9 | 148 | 5 | 10 |
| 20 | 18 | COMMODITY-CODE | 9 | 153 | 3 | |
| 21 | 18 | CLIENT-CODE | 9 | 156 | 5 | 11 |
| 22 | 18 | CLIENT-NAME1 | X | 161 | 30 | 30, 31, 32 |
| 23 | 18 | QUANTITY-OF-RECEIVED-ORDER | 9 | 191 | 4 | 38 |
| 24 | 18 | UNIT-PRICES-OF-RECEIVED-ORDER | 9 | 195 | 5 | 39 |
| 25 | 18 | AMOUNT-OF-RECEIVED-ORDER | 9 | 200 | 6 | 9, 38, 39, 40 |
| ⋮ | ⋮ | | | | | |

FIG. 8

| SERIAL NO | NAME OF SIMILAR ITEM | COMPARISON RELATIONSHIP | DATA ITEM |
|---|---|---|---|
| | ⋮ | | |
| 5 | ORDER RECEPTION NO | SLIP-NO, ORDER-RECEPTION-CODE<br>SLIP-SERIAL-NO, ORDER-RECEPTION-CODE | SLIP-NO<br>SLIP-SERIAL-NO<br>ORDER-RECEPTION-CODE<br>⋮ |
| 6 | CLIENT NO | CLIENT-NO, CLIENT-CODE<br>CLIENT-NO, CLIENT-SERIAL-NO<br>CLIENT-SERIAL-NO, CLIENT-CODE<br>⋮ | CLIENT-NO<br>CLIENT-CODE<br>CLIENT-SERIAL-NO<br>⋮ |
| | ⋮ | | |

FIG. 9

| DATA ITEM LIST | |
|---|---|
| SIMILAR ITEM | DATA ITEM NAME |
| | BUSINESS-CATEGORY-CODE |
| | AMOUNT |
| | CLIENT-NO |
| * | CLIENT NO |
| | CLIENT-CODE |
| | CLIENT-SERIAL-NO |
| | ⋮ |
| | ORDER-RECEPTION-CODE |
| | ⋮ |
| * | ORDER RECEPTION NO |
| | ⋮ |

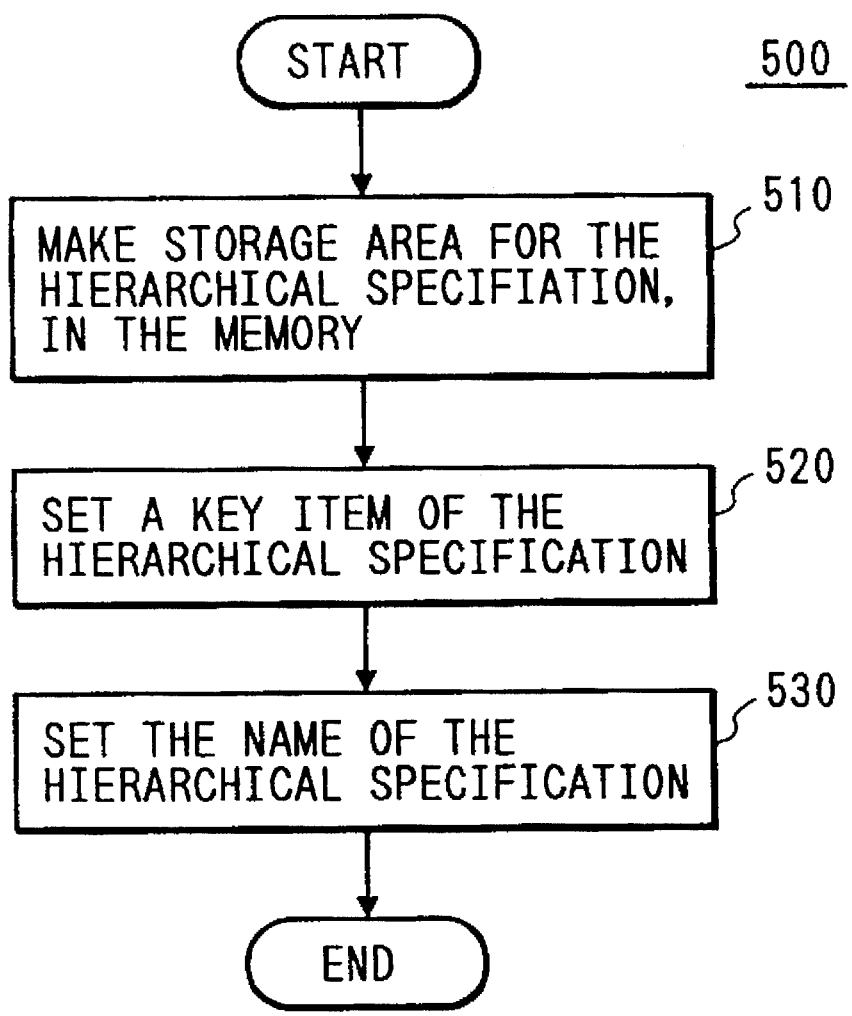

FIG. 11

| SERIAL NO | TITLE | KEY ITEM | ATTRIBUTE DATA ITEM | SERVICE PROCEDURE | UPPER SERIAL NO |
|---|---|---|---|---|---|
| | ↙41 | ↙42 | ↙43 | ↙44 | ↙45 | ↙46 |
| 2 | .. | ORDER RECEPTION NO | | | 0 |
| | | | | | |
| | | | .. | .. | |
| | .. | | | | |

| NAME OF SERVICE PROCEDURE | CONTENT OF SERVICE: ORDER RECEPTION | |
|---|---|---|
| | USING INFORMATION | CONTENT OF PROCEDURE |
| ⋮ | ⋮ | |
| set UNIT PRICES OF RECEIVED ORDER | (UNIT PRICE) | MOVE (UNIT PRICE) TO UNIT PRICES OF RECEIVED ORDER |
| set QUANTITY OF RECEIVED ORDER | (QUANTITY) | MOVE (QUANTITY) TO QUANTITY OF RECEIVED ORDER |
| init AMOUNT OF RECEIVED ORDER | | MOVE 0 TO AMOUNT OF RECEIVED ORDER |
| set AMOUNT OF RECEIVED ORDER | | COMPUTE AMOUNT OF RECEIVED ORDER = UNIT PRICES OF RECEIVED ORDER * QUANTITY OF RECEIVED ORDER |
| get UNIT PRICES OF RECEIVED ORDER | | GOBACK UNIT PRICES OF RECEIVED ORDER |
| set CLIENT NO | (CLIENT NO) | MOVE (CLIENT NO) TO CLIENT NO |
| | ⋮ | |

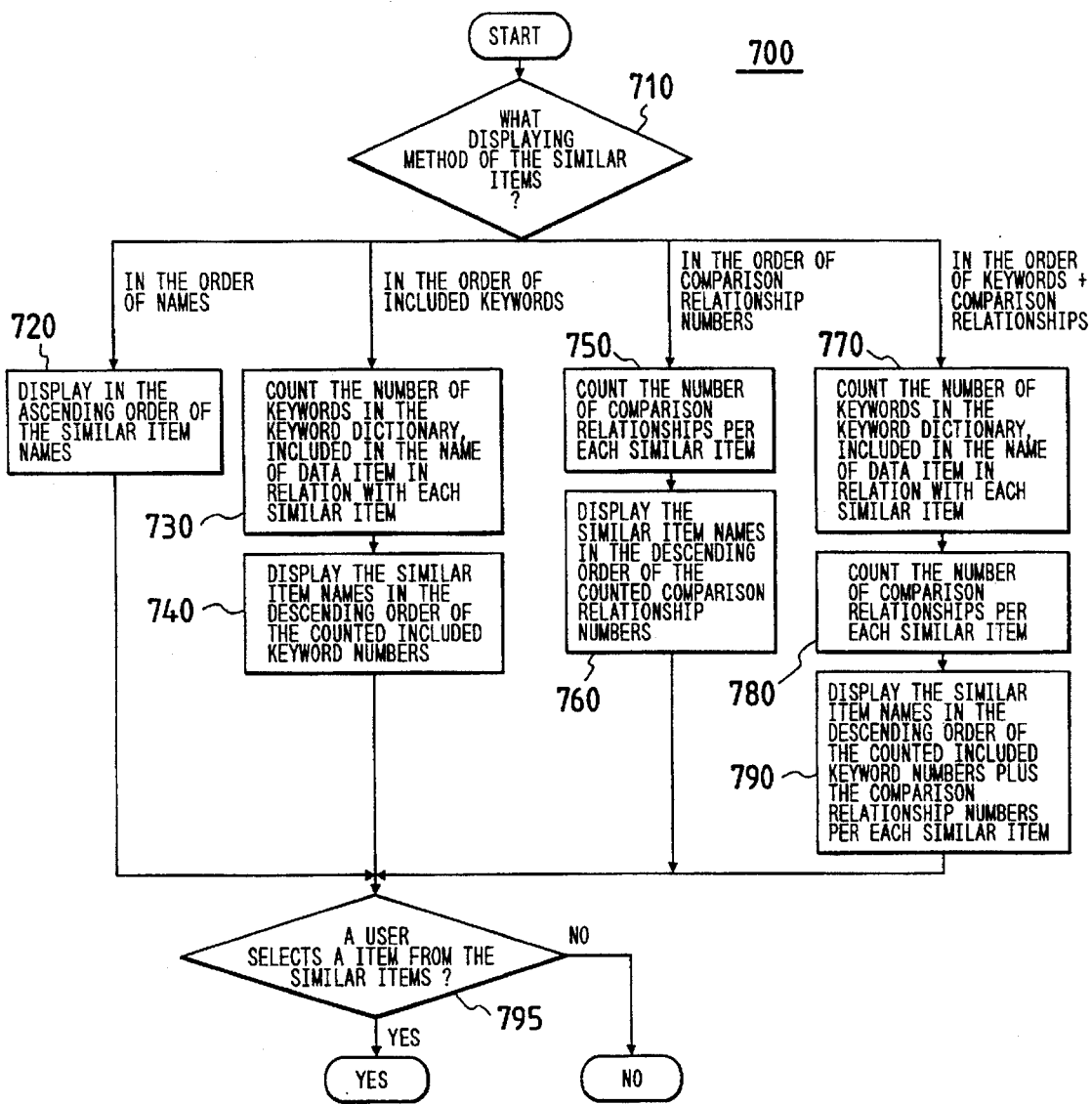

FIG. 19

| LIST OF ORDER OF INCLUDED KEYWORD NUMBER | |
|---|---|
| SIMILAR ITEM NAME | INCLUDED KEYWORD NUMBER |
| ORDER RECEPTION NO | 10 |
| CLIENT NO | 8 |
| ⋮ | ⋮ |
| COMMODITY NAME | 0 |

| LIST OF ORDER OF COMPARISON RELATIONSHIP NUMBER | |
|---|---|
| SIMILAR ITEM NAME | COMPARISON RELATIONSHIP NUMBER |
| CLIENT NO | 5 |
| ORDER RECEPTION NO | 2 |
| ⋮ | ⋮ |
| COMMODITY NAME | 0 |

| LIST OF KEYWORD + COMPARISON RELATIONSHIP | |
|---|---|
| SIMILAR ITEM NAME | KEYWORD + COMPARISON RELATIONSHIP |
| CLIENT NO | 13 |
| ORDER RECEPTION NO | 12 |
| ⋮ | ⋮ |
| COMMODITY NAME | 0 |

| SERIAL NO 67 | NAME 68 | KEY ITEM 69 | ATTRIBUTE DATA ITEM 70 | SERVICE PROCEDURE 71 | UPPER SERIAL NO 72 |
|---|---|---|---|---|---|
| 2 | GENERAL ORDER-RECEPTION | | QUANTITY OF RECEIVED ORDER<br>CLIENT NO<br>.. | set QUANTITY OF RECEIVED ORDER<br>get QUANTITY OF RECEIVED ORDER<br>.. | 3 |
| 3 | ORDER-RECEPTION | ORDER RECEPTION NO | UNIT PRICES OF RECEIVED ORDER | set UNIT PRICES OF RECEIVED ORDER<br>get UNIT PRICES OF RECEIVED ORDER | 0 |
| .. | .. | | | | |

| SERIAL NO 74 | NAME 75 | KEY ITEM 76 | ATTRIBUTE DATA ITEM 77 | SERVICE PROCEDURE 78 | UPPER SERIAL NO 79 |
|---|---|---|---|---|---|
| 2 | ORDER-RECEPTION | ORDER RECEPTION NO | UNIT PRICES OF RECEIVED ORDER<br>QUANTITY OF RECEIVED ORDER<br>CLIENT NO<br>.. | set UNIT PRICES OF RECEIVED ORDER<br>get UNIT PRICES OF RECEIVED ORDER<br>set QUANTITY OF RECEIVED ORDER<br>.. | 0 |
| 3 | GENERAL ORDER-RECEPTION | | .. | | 2 |

FIG. 27

| SERIAL NO | NAME | KEY ITEM | ATTRIBUTE DATA ITEM | SERVICE PROCEDURE | UPPER SERIAL NO |
|---|---|---|---|---|---|
| 2 | ORDER-RECEPTION | ORDER RECEPTION NO | | | 0 |
| 3 | COMMODITY OF RECEIVED ORDER | COMMODITY NO | UNIT PRICES OF RECEIVED ORDER<br>QUANTITY OF RECEIVED ORDER<br>(CLIENT) ~2701<br>. . | set UNIT PRICES OF RECEIVED ORDER<br>get UNIT PRICES OF RECEIVED ORDER<br>set QUANTITY OF RECEIVED ORDER<br>. . | 2 |
| 4 | BUSINESS CATEGORY | BUSINESS CATEGORY CODE | BUSINESS CATEGORY NAME | set BUSINESS CATEGORY NAME<br>get BUSINESS CATEGORY NAME<br>. . | 0 |
| 5 | CLIENT | CLIENT NO | CLIENT-NAME<br>CLIENT ADDRESS<br>(BUSINESS CATEGORY)<br>. . | set CLIENT-NAME<br>get CLIENT-NAME<br>get BUSINESS CATEGORY<br>. . | 0 |
| . . | | | | | |

FIG. 28

| NAME OF SERVICE PROCEDURE | CONTENT OF SERVICE: ORDER RECEPTION | |
|---|---|---|
| | USING INFORMATION | CONTENT OF PROCEDURE |
| .. | .. | .. |
| set UNIT PRICES OF RECEIVED ORDER | UNIT PRICE | MOVE UNIT PRICE TO UNIT PRICES OF RECEIVED ORDER |
| set QUANTITY OF RECEIVED ORDER | QUANTITY | MOVE QUANTITY TO QUANTITY OF RECEIVED ORDER |
| init AMOUNT OF RECEIVED ORDER | | MOVE 0 TO AMOUNT OF RECEIVED ORDER |
| set AMOUNT OF RECEIVED ORDER | | COMPUTE AMOUNT OF RECEIVED ORDER = UNIT PRICES OF RECEIVED ORDER * QUANTITY OF RECEIVED ORDER |
| get UNIT PRICES OF RECEIVED ORDER | | RETURN UNIT PRICES OF RECEIVED ORDER |
| .. | .. | .. |
| get CLIENT | | RETURN (CLIENT) |
| .. | .. | .. |

| NAME OF SERVICE PROCEDURE | CONTENT OF SERVICE: CLIENT | |
|---|---|---|
| | USING INFORMATION | CONTENT OF PROCEDURE |
| .. | .. | .. |
| set CLIENT-NAME | NAME | MOVE NAME TO CLIENT-NAME |
| get CLIENT-NAME | | RETURN CLIENT-NAME |
| get BUSINESS CATEGORY | | RETURN (BUSINESS CATEGORY) |
| .. | .. | .. |

METHOD FOR GENERATING HIERARCHICAL SPECIFICATION INFORMATION FROM SOFTWARE

BACKGROUND OF THE INVENTION

The present invention relates to a method for generating specification information which generates specification information from software (program) and more particularly to a method for generating hierarchical specification information which extracts reusable specification information from already-developed software and generates hierarchical specification information so as to efficiently execute a development operation of new software, an analytical operation, and a maintenance operation for software.

A general software development procedure is to analyze various requests, decide a specification for a system and program, design the structure of system and program on the basis of the decided specification, and code it in a suitable language. Particularly when a large scale and new software is to be generated, the burden imposed on a system engineer or programmer is extremely severe. When there is a software available which is similar to a one to be newly developed, it may be considered to use it. However, for that purpose, it is necessary that a programmer correctly understands the contents of the existing software. Even when the programmer maintains (improving and modifying) the existing software itself, it is necessary that the programmer correctly understands the contents of the software. However, it is not easy generally that a programmer looks at a program itself and understands the contents thereof. To understand the contents of the software, it is necessary that the programmer refers to the specification for the software. However, a specification is not always attached to every software and even if a specification is attached to a software, it is not always ready for use so that a programmer can see it immediately. Therefore, by extracting specification information of already-developed software or by using a part of a source program as a program part and storing it in a data base or others so as to improve the productivity of software and improve the efficiency of a maintenance operation, reuse of it for development of new software or a method for using it for an analytical operation and a maintenance operation of already-developed software is considered.

Specification information of software is a series of information prescribing the function, structure, processing contents, and use method for the software and is represented by sentences and diagrams.

More concretely, specification information of software is a set of a definition of a data item and and a procedure (processing) for the data item.

As mentioned above, a method and a system for extracting specification information from already-developed software are indicated, for example, in "Reverse Engineering: Markets, Method and Tools, Rosemary R. Evans and KeithHales, Ovum Ltd., 1990".

Particularly, as a system for extracting data related information from definition information and file information of a data base, Bachman110n Re-engineering Product Set (Volume 2, p. 27 to 36 of the aforementioned reference) is commercialized. This is a system for extracting design information from various data base definitions and COBOL record definitions, extracting a data model indicating the relationship between data on the basis of the extracted design information, and reusing them for development of new software. Since relational information between data is extracted and reused by this prior art, the productivity of software is improved and the efficiency of operations of analyzing and maintaining data relations is improved.

A method for extracting "object oriented development specification information" having a data collection and a procedure for the data collection from already-developed software is also proposed.

A prior art relating to the aforementioned method is indicated in Japanese Patent Application Laid-Open No. 04-260925. By this method, it is possible to normalize data (conversion into data in the standard format), collect a related procedure for each normalized data, and obtain reusable specification information. Since this prior art integrates and extracts data and a data-related procedure, the productivity of software is improved.

In the former prior art for extracting a data model, an art for extracting a procedure referring to the data is not indicated. As to the data model to be extracted, only the inter-data relationship is represented by storing data (entity) and the relationship with the data but hierarchical classification indicating the derivative relation of data which is necessary to understand and reuse the data is not indicated. In the latter prior art for extracting object oriented development specification information, it is premised that a different data name has different data contents so as to normalize the data. However, there are many alias data in a conventional existing system, so that an operation for standardizing data names in the existing software beforehand is necessary. Furthermore, it is necessary to normalize data for the whole object system. Therefore, it is impossible to extract object oriented development specification information from some software in the object system and add object oriented development specification information which is newly extracted to existing object oriented development specification information, so that an operation necessary to understand and reuse data is extremely limited.

SUMMARY OF THE INVENTION

An object of the present invention is to provide a method for generating hierarchical specification information in which a relation procedure as well as stored data can be reused efficiently.

Another object of the present invention is to provide a method which can generate hierarchical specification information without standardizing alias data of existing software beforehand when the aforementioned hierarchical specification information is extracted.

Still another object of the present invention is to provide a method which can simply expand hierarchical specification information.

To accomplish the first object, the method for generating hierarchical specification information of the present invention has a step for analyzing a program, a step for storing a procedure related to a data item in relation with the data item according to the analyzed information, a step for storing data items sharing a used area or data items which transfer data as similar items by relating them to each other, a step for storing similar items which are selected by a user as a key item and an attribute data item, and a step for storing a procedure related to the attribute data item as a service procedure and generating a hierarchical specification consisting of the stored key item, attribute data item, and service procedure. When some data items are hierarchical each other, a pair of the definitions of the data items and the corresponding procedures, that is, the specification information is also hierarchical. A specification which is hierarchical like this is called a hierarchical specification.

According to the method of the present invention, a hierarchical specification which is newly generated is generated in relation with the upper or lower of the hierarchical specification. There are the following three methods available. The first method is a method that when the similar items which are selected by a user as key items are a part of the key items included in the upper hierarchy of the hierarchical specification, a hierarchical specification is newly generated in relation to the similar items which are not duplicated with the key items included in the upper hierarchy in the hierarchical specification among the similar items selected by the user to the lower of the hierarchical specification as key items. The second method is a method that when a hierarchical specification such that the key items included in the upper hierarchy of the hierarchical specification are a part of the similar items selected by the user as key items is detected, the similar items selected by the user are deleted from the key items included in the hierarchical specification and a hierarchical specification is newly generated in relation to the similar items selected by the user to the upper of the hierarchical specification as key items. The third method is a method which allows a user to select one of a method that when the similar items selected by the user as key items are all in coincidence with the key items included in the upper hierarchy in the hierarchical specification or the similar items which are in incoincidence with any key items remain, the user is inquired and a hierarchical specification is newly generated by relating the similar items having no key items to the lower of the hierarchical specification and of a method that a hierarchical specification is newly generated by relating them to the upper of the hierarchical specification as key items of the hierarchical specification and the key items of the hierarchical specification are deleted.

A data item which is dependent on a record including a data item in which the similar item selected by a user so as to create an attribute data item and the key item of the hierarchical specification are related to each other is indicated to the user and the similar item related to the data item selected by the user is detected. When another hierarchical specification including an attribute data item in a key item is detected, the attribute data item is changed to information indicating the relationship with the detected hierarchical specification. In creation of service procedures related to the attribute data item, a procedure for initializing data and a procedure for ending data are separated from the service procedures so as to create another service procedure.

To accomplish the second object, the method for generating hierarchical specification information of the present invention stores data items sharing a used area or data items between which data is transferred as similar items by relating them to each other when the hierarchical specification information is extracted and stores the information stored as a similar item and a collection of the data items which are objects for the comparison procedure in relation with each other. When the similar item to be selected by a user is designated, a data item list is indicated and the similar item which is related to the data a record list which is a collection of data items is indicated, and the data item dependent on the record selected by the user is indicated, and the similar item related to the data item selected by the user is detected. The number of words in the keyword dictionary stored in the memory beforehand which are included in the name character string of the data item related to the similar item is calculated for each similar item, and a similar item list which is created in the descending order of calculated values is indicated, and a similar item is selected by a user on the basis of the list. The number of comparison relationships in a similar item is calculated, and a similar item list which is created in the descending order of calculated values is indicated, and a similar item is selected by the user. A similar item list which is created in the descending order of the total values of the calculated value of the number of words included in the aforementioned keyword dictionary for each similar item and of the calculated value of the number of comparison relationships in each similar item is indicated and a similar item is selected by the user on the basis of the list.

To accomplish the third object, according to the method for generating hierarchical specification information of the present invention, a hierarchical specification is newly added to the aforementioned method in relation with the hierarchical specification information which is already generated.

According to the method for generating hierarchical specification information of the present invention, a data item and procedure information which are components of a program can be extracted by the step for analyzing a program and information in which a data item and a data operation are capsulized can be reused by the step for storing a procedure related to a data item in connection with the data item. Alias data can be collected by the step for storing similar items. By the step for storing the similar item selected by a user as a key item and an attribute data item, storing a procedure related to an attribute data item as a service procedure, and generating a hierarchical specification consisting of the stored key item, attribute data item, and service procedure, data items (a collection of attribute data items) which are closely related to each other and data items (key items) for distinguishing them from a collection of other attribute data items can be summarized as a specification and operations for alias data included in already-developed software and for a collection of data which is closely related to data and distinguished by a key item can be summarized.

Furthermore, by generating the aforementioned specification information having high reusability in which the upper or lower level of the specification information is related so that no key item is duplicated, the derivative of the specification information can be related and extracted by a hierarchy.

By indicating a data item of a record related to a key item to a user when a similar item is selected so as to create an attribute data item, the data item which is used simultaneously with the key item in already-developed software can be selected.

When there is another hierarchical specification including an attribute data item in a key item, by changing the attribute data item to information related to the detected hierarchical specification, duplication of the attribute data item between the hierarchical specifications is eliminated and the hierarchical specifications can be related to each other.

By executing the initializing or ending procedure among the service procedures which are related to an attribute data item as another service procedure, specification information having a more actual operation procedure is extracted.

According to the method for generating hierarchical specification information of the present invention, by storing data items sharing a used area or data items between which data is transferred as similar items by relating them to each other, alias data items are collected and by additionally relating and storing data items which are objects for the comparison procedure, data items which handle similar data are collected.

When a similar item is designated, the similar item is selected interactively from the data item or record list. Or, the similar item is selected from the similar item list which is created in the descending order of the number of words included in the keyword dictionary. Or, the similar item is selected from the similar item list which is created in the descending order of the number of comparison relationships included in each similar item. Or, the similar item is selected from the similar item list which is created in the descending order of the total values of the calculated value of the number of words included in the keyword dictionary for each similar item and of the calculated value of the number of comparison relationships in each similar item. Therefore, a similar item having a high possibility of being a key item is indicated and selected on a priority basis.

The second object is accomplished by the aforementioned procedure.

According to the method for generating hierarchical specification information of the present invention, a hierarchical specification is newly added in relation with the generated hierarchical specification information, so that the hierarchical specification information can be expanded easily.

The third object is accomplished by the above means.

BRIEF DESCRIPTION OF THE DRAWINGS

FIG. 2 is a drawing showing a hardware environment of this embodiment.

FIG. 3 is a drawing showing the definition division of the source program.

FIG. 4 is a drawing showing the procedure division of the source program.

FIG. 5 is a drawing showing analysis information of data definition division.

FIG. 6 is a drawing showing analysis information of procedure division.

FIG. 7 is a drawing showing an example in which the creation procedure is related for each data item.

FIG. 8 is a drawing showing similar item information.

FIG. 9 is a drawing showing a data item list.

FIG. 10 is a flow chart for generating a hierarchical specification.

FIG. 11 is a drawing showing hierarchical specification information.

FIG. 15 is a drawing showing a display of a service procedure.

FIG. 17 is a flow chart of display selection of a similar item.

FIG. 18 is a drawing showing a keyword dictionary.

FIG. 19 is a drawing showing an example of a display of a similar item list.

FIG. 21 is a drawing showing an example of hierarchical specification information added to the upper.

FIG. 22 is a drawing showing an example of hierarchical specification information added to the lower.

FIG. 27 is a drawing showing hierarchical specification information added to the lower.

FIG. 28 is a drawing showing a display of a service procedure which changes procedure contents.

DESCRIPTION OF THE PREFERRED EMBODIMENTS

An embodiment of the present invention will be explained hereunder with reference to the accompanying drawings.

Figure 1:
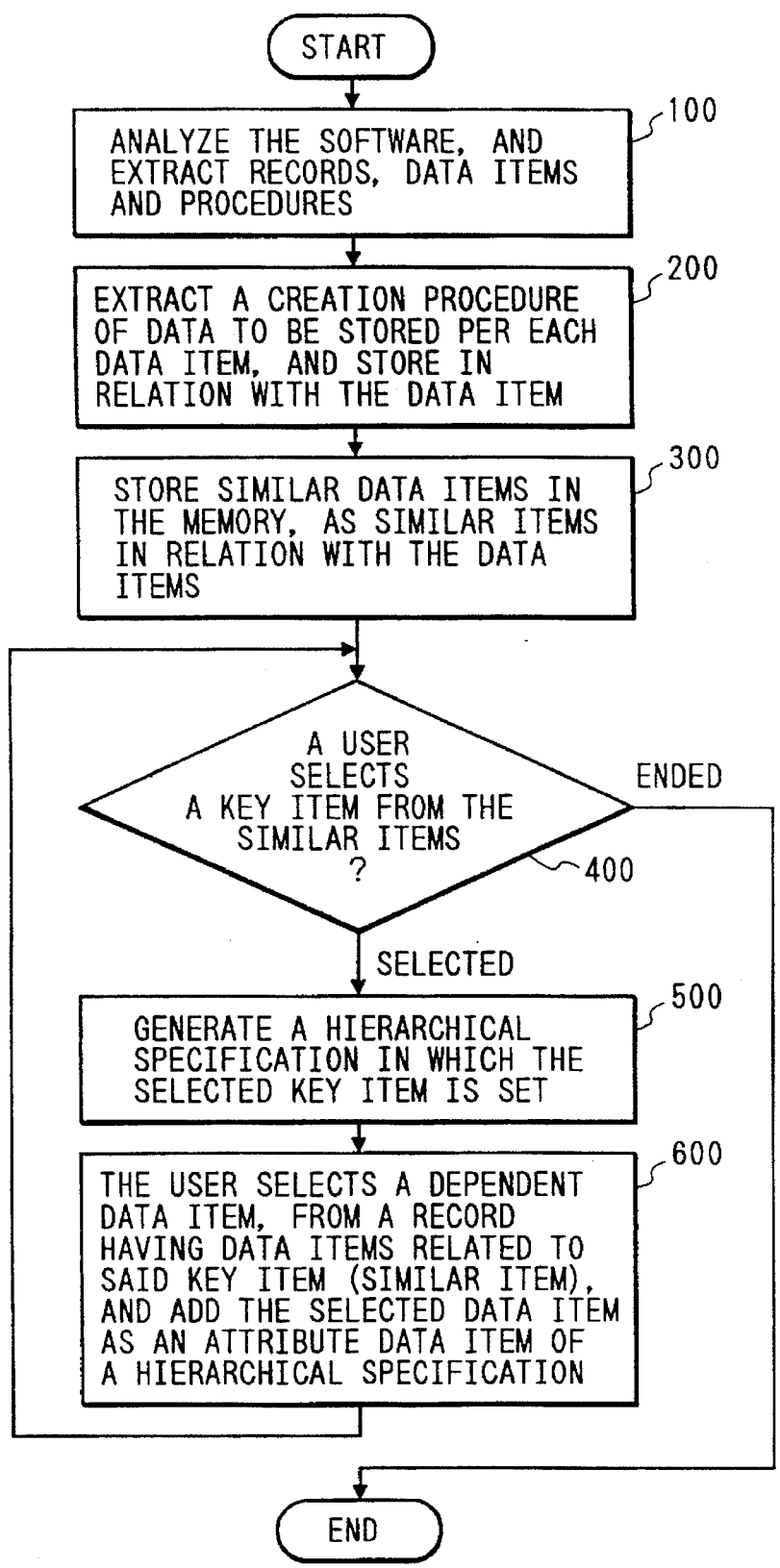
FIG. 1 is a flow chart of the first embodiment of the present invention.

FIG. 1 is a flow chart showing the processing procedure of the first embodiment of the present invention. FIG. 2 is a drawing showing the hardware environment of this embodiment. The hardware environment shown in FIG. 2 consists of a CPU 1 (central processing unit) for executing various processes such as retrieval, analysis, and comparison operation, a memory 2 for storing information to be processed and processing results, a low speed and large capacity external storage device 3 for storing the source program and others, an I/O device 4 such as a keyboard, and an output device 5 such as a display device and a printer.

The method for generating hierarchical specification information of the present invention will be explained on the basis of the flow chart shown in FIG. 1.

At Step 100 shown in FIG. 1, to extract a data item and procedure information which are components of the hierarchical specification, the source program stored in the external storage device 3 is analyzed and analysis information of data definition division and analysis information of procedure division are generated and stored in the memory 2.

FIG. 3 shows an example of a definition division 9 of a program source described in the COBOL language and FIG. 4 shows an example of a procedure division 10 of a program source described in the COBOL language.

FIG. 5 shows an example of analysis information of data definition division 11 which is generated by analysis of the data definition division 9 of the source program shown in FIG. 3.

The data definition division of the source program shown in FIG. 3 is analyzed sequentially item by item and the analysis information of data definition division is generated and stored in the memory 2. As shown in FIG. 5, the analysis information of data definition division 11 consists of a serial NO column 12 for identifying analyzed information, a parent serial NO column 13 which is a serial No. of a dependent item, a data item name column 14, an attribute column 15, a displacement position column 16 on the source program, and a length column 17. Each information of a file, a record, and a data item which are stored in the analysis information of data definition division 11 is called just a "data item" hereinafter.

For example, when a data definition 301 shown in FIG. 3, that is, "02 slip-NO PIC 9 (5)." is analyzed, analysis information of data definition division as shown in FIG. 5 in which the serial NO column 12 indicating the analytical order is "11", and the data item name column 14 is "slip-NO", and the attribute column 15 is "9", and the displacement position column 16 is "120", and the length column 17 is "5", and the parent serial NO column 13 is a parent serial NO "10" indicating the serial No. of "slip-record" which is the upper of the data hierarchy is obtained.

A data definition 302 shown in FIG. 3, that is, "02 slip-serial NO PIC X (5) REDEF slip-NO." indicates that the data definition 301 is redefined and like the analysis information shown in the column of serial NO column 12 in FIG. 5, the value of the displacement position column 16 is set to a value of "120" which is the same as the value of the displacement position column 16 of the serial No. 11. FIG. 6 shows an example of analysis information of procedure division which is generated by analyzing the procedure division shown in FIG. 4.

The procedure division of the source program shown in FIG. 4 is analyzed sequentially command by command and analysis information of procedure division is generated and stored in the memory 2. As shown in FIG. 6, the analysis information of procedure division 18 consists of a serial NO column 19 for identifying analyzed information, a command name column 20, a content of command column 21, a parent serial NO column 22, and a next serial NO column 23. A data item name used in the content of command column 21 is related to the record and data item of the analysis information of data definition division which is analyzed previously.

For example, when a command 401 shown in FIG. 4, that is, "MOVE client-name TO client-name 1" is analyzed, analysis information of procedure division as shown in FIG. 6 in which the serial NO column 19 indicating the analytical order is "32", and the command name column 20 is "MOVE", and the content of command column 21 is "client-name TO client-name 1", and the parent serial NO column 22 is "31" indicating the serial No. of "THEN" which is the upper level of the command hierarchy, and the next serial NO column 23 is "33" indicating the next serial NO is obtained. "Client-name" and "client-name 1" of the content of command column 21 indicate the data items of the serial No. 28 and the serial No. 22 of the analysis information of data definition division shown in FIG. 5 respectively.

At the next Step 200, since the hierarchical specification is structured so that a data item is primary and a related procedure is secondary, a creation procedure is extracted from the analysis information of procedure division for each data item of the analysis information of data definition division and stored in relation with the data item.

FIG. 7 shows an example of a result 24 of Step 200 in which a creation procedure is stored for each data item of the analysis information of data definition division in relation with the data item and the result of Step 200 consists of a serial NO column 25 indicating the analytical order, a parent serial NO column 26, a data item column 27 indicating a data item, an attribute column 28, a displacement position column 29, a length column 30, and a creation procedure column 31.

At Step 200, a creation procedure is extracted by the following processing for each data item. A command which has the data item shown in the data item 27 in the creation destination (data storage destination) is detected from the analysis information of procedure division and the serial No. of the detected command is stored in the creation procedure column 31 corresponding to the data item. Next, the parent serial No. indicating the upper command of the aforementioned command is added to the data item creation procedure column 31. Next, the aforementioned processing is repeated until the commands of the parent serial No. of the aforementioned command are exhausted. A data item which is the creation source in a command having the data item at the creation destination is also processed in the same way as with the aforementioned and the serial No. of the extracted command is added to the data item creation procedure column 31.

For example, a command in which the data item "client-name" which is indicated by the serial No. 22 shown in FIG. 7 is the creation destination is searched from the analysis information of procedure division 18 shown in FIG. 6. In the example shown in FIG. 6, the command of the serial No. 32 "client-name TO client-name 1" is detected. This serial No. 32 is stored in the creation procedure column 31 of the data item "client-name 1" indicated by the serial No. 22 shown in FIG. 7. Next, since the parent serial No. 30 is given to the serial No. 31 shown in FIG. 6 in addition, the parent serial No. 30 is added to the creation procedure column 31 of the data item "client-name 1" indicated by the serial No. 22 shown in FIG. 7. Then, when the parent serial No. of the serial No. 30 shown in FIG. 6 is referred to, the parent serial No. is 0 and it means that there is no upper command, so the the processing for collecting parent serial Nos. ends. As to the data item "client-name" which is the creation source in the command of the serial No. 32 shown in FIG. 6 which is an command in which the data item "client-name" is the data storage destination, a command in which the data item "client-name" is the creation destination is searched. In this example, no command can be detected, so that the processing for extracting a creation procedure relating to the data item "client-name 1" indicated by the serial No. 22 shown in FIG. 7 ends.

At the next Step 300, to create a key item and an attribute data item in a hierarchical specification which handles a plurality of data items of alias as an item, a data item which handles the same data by a movement command sharing the same memory area or the area in the same external storage device or handles similar data by a comparison command among the data items of the analysis information of data definition division is extracted and stored in the memory 2 in relation with similar item information.

FIG. 8 is a drawing showing an example of the result obtained by the processing at Step 300 which is similar item information related as alias. As shown in FIG. 8, the similar item information 32 consists of a serial NO column 33, a name of similar item name column 34, a comparison relationship column 35, and a data item column 36. The serial NO column 33 indicates a serial No. for identifying a similar item and the data item column 36 is information for indicating a data item which is extracted as a similar item. In FIG. 8, the name of a data item is indicated in place of the serial No. of the data item for reason of explanation. There is the name of any data item in the name of similar item column 34 and it can be changed by a user by displaying similar item information in the output device later.

At Step 300, data items of alias are collected by the following processing and the similar item information 32 is generated. Data items in which the displacement position and length are the same are searched from the analysis information of data definition division 11 and similar items having any of the detected data items in the data item column are searched. When a similar item is detected, it is added so that a data item which is detected previously is not duplicated in the data item column 36 of the similar item. When there is no relevant similar item, a serial No. is assigned to the data item which is detected previously and stored in the data item column 36 and a data item name among the stored data items is added as a name of similar item and stored in the memory. For each movement command in the analysis information of procedure division 18, a similar item having the data item of the creation source or creation destination in the data item column 36 is searched from the similar item information 32. When it is detected, addition to or creation of the similar item is executed for the data item in the movement command in the same way as with the above mentioned. For each comparison command in the analysis information of procedure division 18, a similar item having a comparison data item in the data item column is searched from the similar item information 32. When it is detected, addition to or creation of the similar item is executed for the data item in the movement command in the same way as with the above mentioned and the data item under comparison is added so that it is not duplicated in the comparison relationship column 35.

For example, data items in which the displacement position and length are the same are searched from the analysis information of data definition division 11 shown in FIG. 5. In the example shown in FIG. 5, the data items "slip-NO" and "slip-serial-NO" of the serial No. 11 and the serial No. 12 in which the displacement position "120" and the length "5" are the same are detected and similar items having one of the data items "slip-NO" and "slip-serial-NO" in the data item column are searched. When no similar item is detected, a new serial No., for example, serial No. 5 is added and "slip-NO" or "slip-serial-NO" is stored in the data item column 36 of the serial No. 5. "Order-reception-NO" in the name of similar item column 34 shown in FIG. 8 is processed assuming that it is changed by a user by displaying the similar item information on the output device later. For a movement command in the analysis information of procedure division 18 shown in FIG. 6, for example, a movement command "MOVE slip-NO TO order-reception-code" shown in the serial No. 10, similar items having "slip-NO" and "order-reception-code" in the data item column are searched. In the example shown in FIG. 6, since "slip-NO" is stored in the previous example, the similar item of the serial No. 5 shown in FIG. 8 is detected and the data items "slip-NO" and "order-reception-code" are added without being duplicated (in this case, since "slip-NO" is already stored, only "order-reception-code" is added). For a comparison command in the analysis information of procedure division 18 shown in FIG. 6, for example, a comparison command "IF client-code=client-serial-NO" shown in the serial No. 30, similar items having "client-code" and "client-NO" in the data item column 36 are searched. In the example shown in FIG. 6, the similar item of the serial No. 6 shown in FIG. 8 is detected and the data items "client-code" and "client-NO" are added without being duplicated and "client-code" and "client-NO" (regardless of the order) are added to the comparison relationship column without being duplicated.

At the next Step 400, the name of a data item or a similar item is displayed on the output device on the basis of the key for identifying the hierarchical specification and a similar item related to the similar item selected by a user or the data item selected by a user is obtained.

FIG. 9 shows an example that a list 37 of data items and similar items is displayed on the output device 5.

The data item names in the analysis information of data definition division 11 and the similar item names in the similar item column in the similar item information 32 are reenumerated in the ascending order and displayed in the data item name column 39 and an identification mark * indicating that the corresponding item is a similar item is displayed in the similar item column 38. A user selects an optional item (data item or similar item) from the displayed list. When the selected item is a similar item name, similar items having the name are searched from the similar item information 32 and the similar items are obtained. When the selected item is a data item, data items having the name in the name column are searched from the analysis information of data definition division 11, and similar items having the detected data items in the data item column are searched from the similar item information 32, and the similar items are obtained.

For example, the data item list 37 shown in FIG. 9 is an example that the data item names in the analysis information of data definition division 11 shown in FIG. 5 and the similar item names in the similar item column in the similar item information 32 shown in FIG. 8 are reenumerated in the ascending order and an identification mark * for a similar item is added to the names in the similar item column and the list is displayed on the output device 5. For example, when a user instructs an item of "order reception No." 901 shown in FIG. 9 from the I/O device 4, since an identification mark * is added to it, a similar item having the name "order-reception-NO" in the similar item column is searched from the similar item information 32. In the example shown in FIG. 9, the similar item shown at the serial No. 5 in FIG. 8 is searched. For example, when a user instructs an item of "client-code" 902 shown in FIG. 9 from the I/O device 4, since no identification mark * is added to it, a data item having the name "client-code" in the name column is searched from the analysis information of data definition division 11 shown in FIG. 5. In the example shown in FIG. 5, the data item of the serial No. 21 is searched and a similar item having the data item in the data item column 36 is searched from the similar item information 32 shown in FIG. 8. In the example shown in FIG. 8, the similar item shown at the serial No. 6 is searched.

At the next Step 500, to generate a hierarchical specification newly, a hierarchical specification having the similar item obtained at Step 400 as a key item is generated in the hierarchical specification information.

Figure 12:
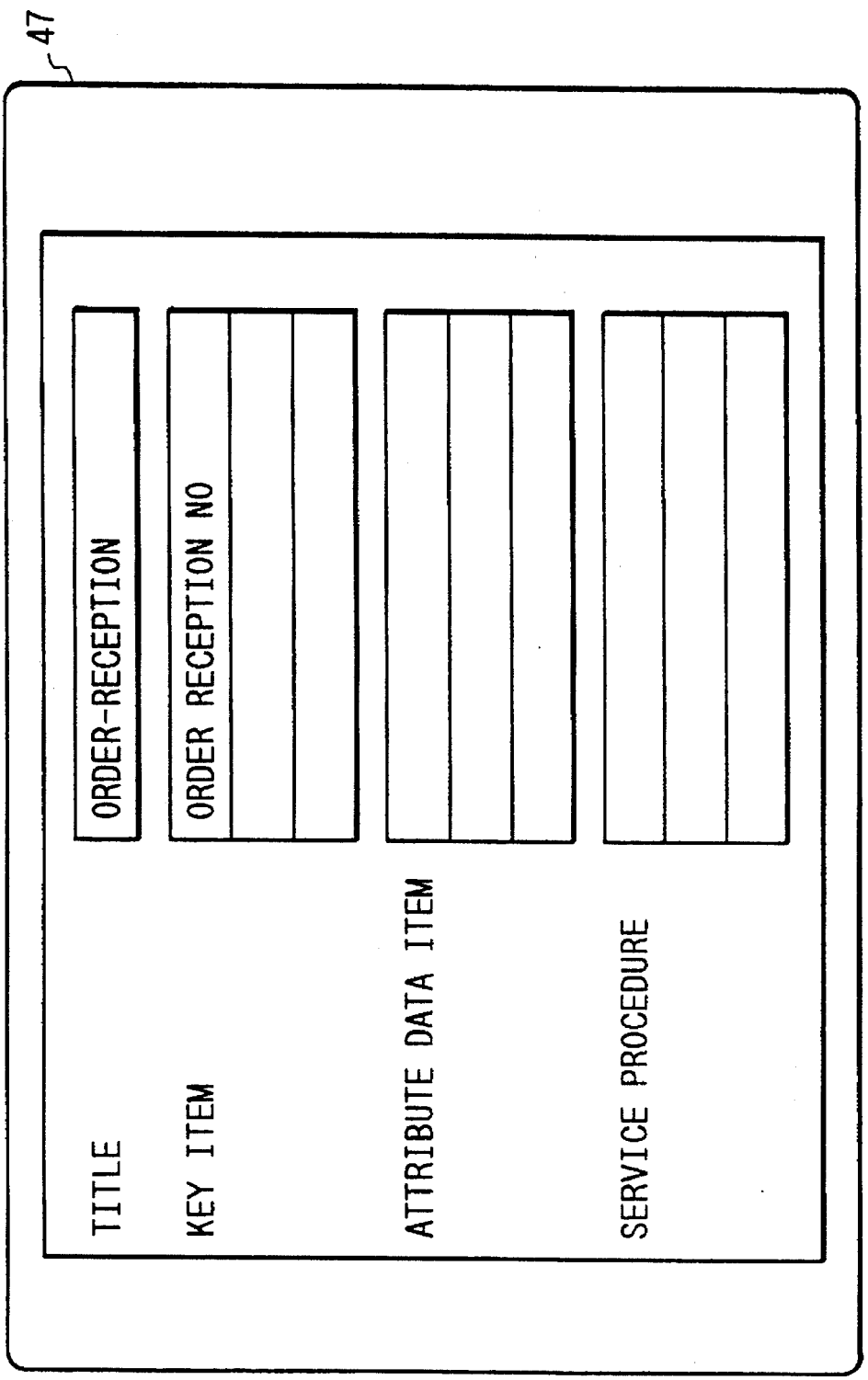
FIG. 12 is a drawing showing a display of a hierarchical specification.

FIG. 10 is a flow chart showing the detailed processing procedure at Step 500. FIG. 11 is a drawing showing an example of hierarchical specification information which is newly generated in the memory 2. Hierarchical specification information 40 consists of a serial NO column 41, a name column 42, a key item column 43, an attribute data item column 44, a service procedure column 45, and an upper serial NO column 46. FIG. 12 shows an example that a hierarchical specification is displayed on the output device.

At Step 510 shown in FIG. 10, a storage area for the new hierarchical specification is created in the memory 2. At the next Step 520, the key item column 43 of the hierarchical specification which is generated at Step 510 and the similar item obtained at Step 400 are related to each other and stored. At the next Step 530, the hierarchical specification which is generated at Steps 510 and 520 is displayed on the output device 5 and when a user inputs a name from the I/O device 4, the obtained name is stored in the name column 42 of the hierarchical specification.

For example, when the similar item "order-reception-No." is obtained at Step 400, as shown in FIG. 11, a hierarchical specification which is identified, for example, by a serial No.

2 is generated in the serial NO column 41 for identifying a hierarchical specification. The similar item "order-reception-NO" is stored in the key item column 43. In the example shown in FIG. 11, "order-reception-NO" is used as a name for explanation and information relating to the similar item "order-reception-NO" is stored. It is also displayed in the attribute data item column 44 and the service procedure column 45.

Among the hierarchical specification information 40 shown in FIG. 11, the hierarchical specification indicated by the serial No. 2 is displayed on the output device 5 for each column. FIG. 12 shows an example that the hierarchical specification information 40 is displayed on the output device 5 and then a user inputs "order-reception" as a name from the I/O device 4. The inputted name "order-reception" is stored in the name column 42 of the hierarchical specification of the serial No. 2 shown in FIG. 11.

At Step 600 shown in FIG. 1, to add an attribute data item and a service procedure in the hierarchical specification, a record having data items related to the key item (similar item) is displayed on the output device 5 and an attribute data item and a service procedure are created on the basis of the data item selected by the user and added to the hierarchical specification information.

Figure 13:
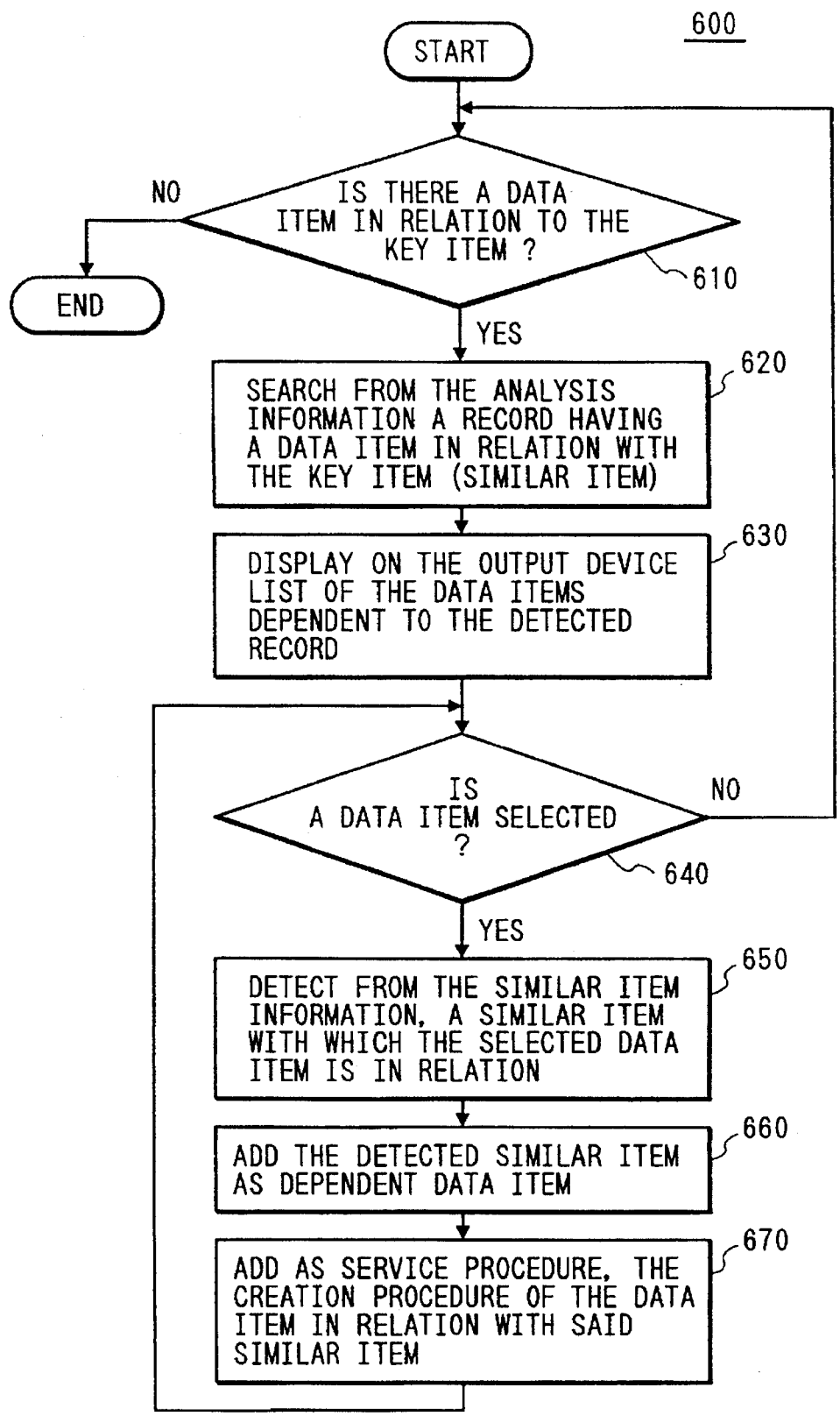
FIG. 13 is a flow chart for generating an attribute data item.
Figure 14:
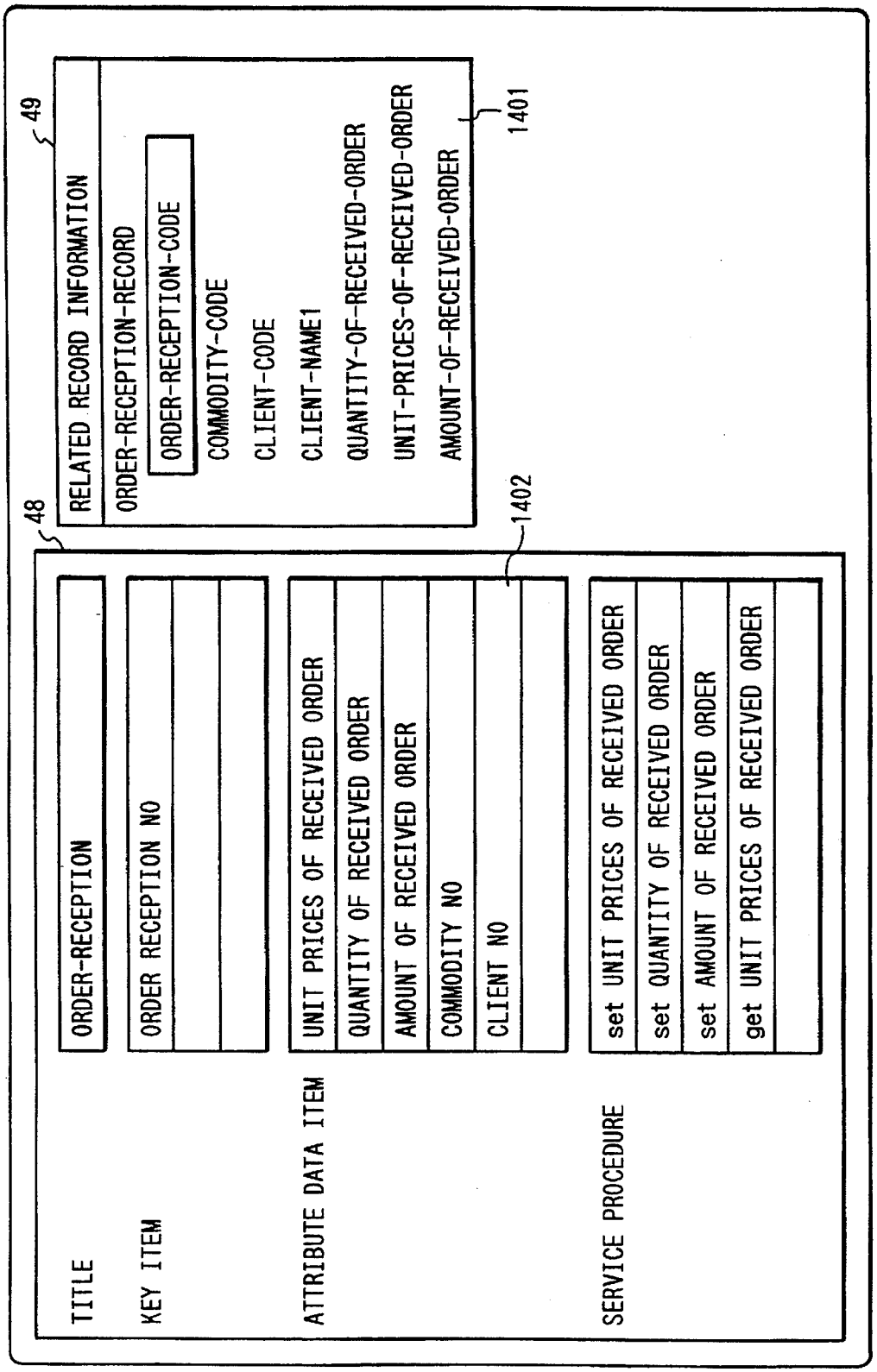
FIG. 14 is a drawing showing a display of a hierarchical specification.

FIG. 13 is a flow chart showing the detailed processing procedure at Step 600. FIG. 14 shows an example that the hierarchical specification and a data item list are displayed on the output device 5 and the display contents thereof consist of a hierarchical specification 48 and related record information 49. FIG. 15 shows an example that the detailed service procedure is displayed on the output device 5.

Step 600 will be explained in detail on the basis of the processing procedure shown in FIG. 13.

The following processing is executed for a data item related to a similar item (hereinafter called a key similar item) related to the key item of the hierarchical specification (Step 610). The parent serial No. of the data item related to the key similar item is searched from the analysis information of data definition division 11 sequentially and the data item of "record" in the attribute column 15 is detected (Step 620). Data items dependent on the data item indicating the detected record are enumerated from the detected data items in the ascending order of serial Nos. and the data item names are listed and displayed on the output device 5 until the attribute column of the next data item becomes "record" (Step 630).

When the name of any data item is selected by the user (Step 640), a data item having the selected name is searched from the analysis information of data definition division 11 and a similar item having the detected data item in the data item column is searched from the similar item information 32 (Step 650). The detected similar item is added to the dependent data item of the hierarchical specification (Step 660). The creation procedure of the data item related to the detected similar item is copied in the service procedure column of the hierarchical specification and the service procedure name is added (Step 670). When the creation source data among the creation procedure of the data item related to the detected similar item is a fixed value, the service procedure is handled as another service procedure. When the data item included in the contents of the service procedure is a data item related to the attribute data item of the hierarchical specification, the data item is changed to a related similar item. In the case of a movement command, the data item of the creation source is added as use information but not changed to a similar item. When the data item is not a data item related to the attribute data item of the hierarchical specification, this data item is added as use information. Furthermore, a procedure for using the attribute data item is added.

For example, in the case of a hierarchical specification 47 shown in FIG. 12, the data item related to the key similar item "order-reception-NO" is the similar item indicated by the serial No. 5 shown in FIG. 8 and the following step is processed for each data item in the data item column (Step 610).

When the corresponding data item in the data item column is, for example, the data item "order-reception-code", the data item indicated by the serial No. 19 of the analysis information of data definition division 19 shown in FIG. 5 which is the data item "order-reception-record" indicated by the parent serial No. "18" is searched. Since the attribute column 15 of the data item of the serial No. 18 is "record", the record "order-reception-record" is detected. When the attribute column 15 of the serial No. 18 is other than "record", the data item indicated by the parent serial No. 13 of the data item of the serial No. 18 is searched in addition and the aforementioned search is repeated until the data item such that the attribute column is "record" is detected (Step 620).

Next, the data items dependent on the detected record "order-reception-record" are extracted. The data items such that the attribute column is "record" are searched from the data items indicated by the serial No. 18 sequentially in the ascending order of serial Nos. In the example shown in FIG. 5, the data item "client-record" of the serial No. 26 is detected and the names of data items from the serial No. 18 to the serial No. 25 which is just prior to the serial No. 26 are listed and displayed on the output device 5 as "related record information" 49 shown in FIG. 14. In this case, the names of data items related to the key similar item are displayed in a different way from that of other data items. In the example shown in FIG. 14, the name is enclosed and displayed in a frame and the origin of the record displayed for the user is shown (Step 630).

When the user selects an optional name from the "related record information" 49 displayed on the output device 5 (Step 640), for example, when "client-code" 1401 shown in FIG. 14 is selected, a data item having the name of "client-code" is searched from the analysis information of data definition division 11 shown in FIG. 5. In the example shown in FIG. 5, the data item of the serial No. 21 is detected. A similar item name for which the detected data item "client-code" is included in the data item column 36 of the similar item information 32 shown in FIG. 8 is searched. In the example shown in FIG. 8, the similar item name "client-NO" indicated by the serial No. 6 is detected as a similar item name having "client-code" in the data item column 36 (Step 650).

Next, the detected similar item name "client-NO" is added as "client-NO" 1402 in the attribute data item of the hierarchical specification "order reception" 48 (Step 660). A command having the creation procedure (refer to the creation procedure column 31 of the serial No. 21 shown in FIG. 7) "11" of the the data item related to the detected similar item "client-NO", for example, the data item "client-code" shown in the data item column of the similar item indicated by the serial No. 6 in the similar item information 32 shown in FIG. 8 as a serial number is searched from the analysis information of procedure division shown in FIG. 6. In the example shown in FIG. 6, the movement command "MOVE client-NO TO client-code" of the serial No. 11 is detected and the command name "MOVE" and the content of command "client-NO TO client-code" are copied as shown in the service procedure 1501 in FIG. 15. For example, "set" indicating creation of the similar item "client-NO" is added to the service name. Since the similar item "client-NO" corresponding to "client-code" of the aforementioned content of command corresponds to the attribute data item of the hierarchical specification, "client-code" is changed to the similar item "client-NO". Since the aforementioned command is the movement command, the data item "client-NO" of the creation source is added to the using information column 52 as it is (1501). In FIG. 15, the data items of using information are enclosed and displayed in parentheses. Since the creation source data is a fixed value, a service procedure 1502 is stored as an initial value setting procedure separately from a service procedure 1503.

A service procedure 1504 is a procedure for using the attribute data item "unit-price-of-received-order" and added separately as a command name "GOBACK" indicating reference to data.

According to the present invention, specification information including data items mainly can be reconstructed from already-developed software and procedures for the data items scattered in the already-developed software are collected as specification information, so that the reusability of the already-developed software is improved and the understanding operation for data can be supported easily.

Figure 16:
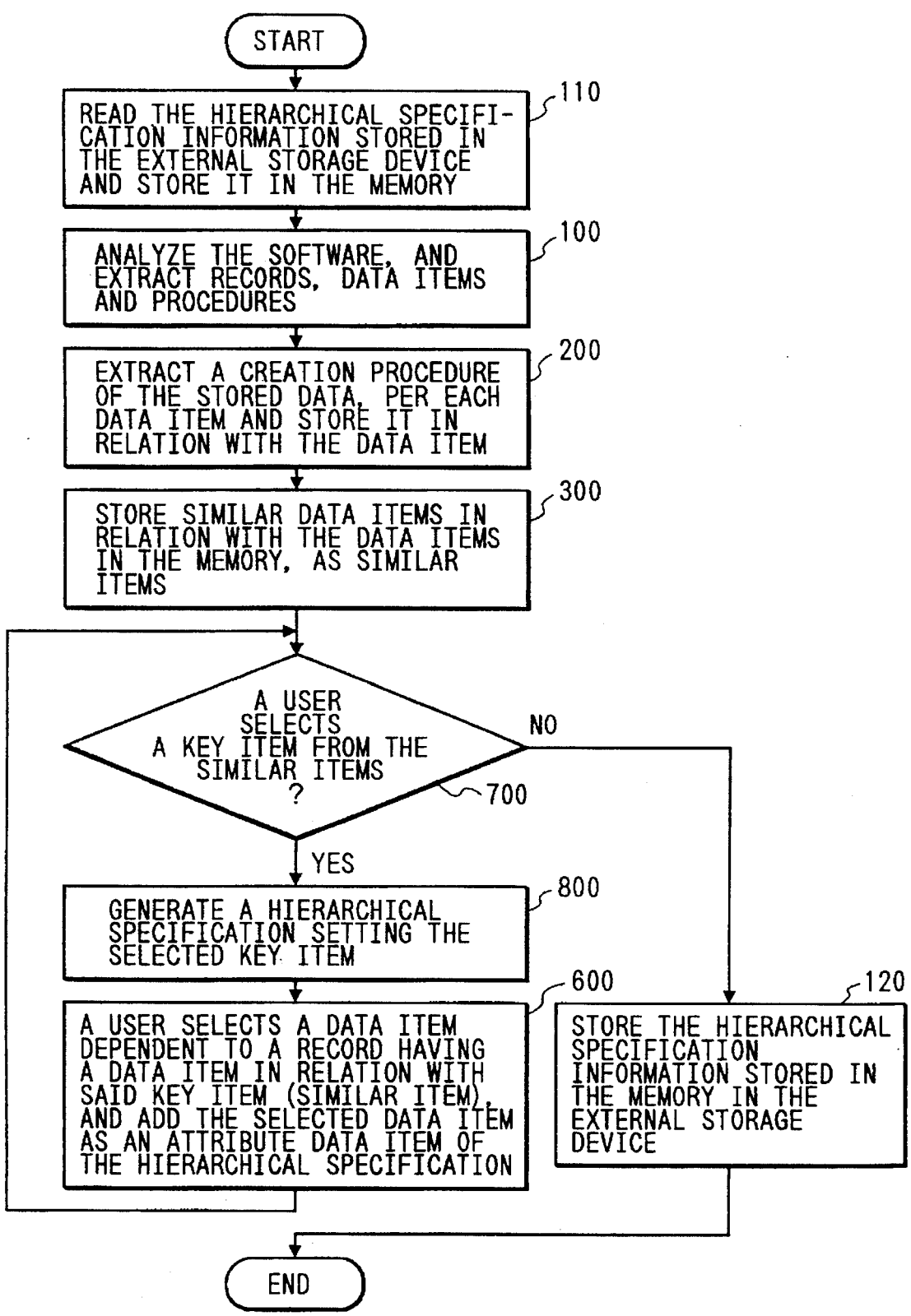
FIG. 16 is a flow chart of the second embodiment of the present invention.

Next, the second embodiment of the present invention will be explained. FIG. 16 is a flow chart showing the processing procedure of the second embodiment. In this embodiment, the processing procedure in FIG. 1 which shows the first embodiment is changed as indicated below. (1) In the method for key item selection by a user shown at Step 400 in FIG. 1, items which can be inferred as a key item are indicated on a priority basis so that the user can select them easily. (2) In generation of a new hierarchical specification shown at Step 500 in FIG. 1, a new hierarchical specification is generated in relation to the existing hierarchical specification using the same key item as that of the generated hierarchical specification. (3) The hierarchical specification information stored in the external storage device 3 is read into the memory and the hierarchical specification information after addition or correction is returned to the external storage device 3.

The processing procedure of this embodiment is almost the same as that of the first embodiment, that is, Step 400 is changed to Step 700 and Step 500 to Step 800 and Steps 110 and 120 are added and the other steps are the same as those of the first embodiment.

At Step 110, to add or correct the hierarchical specification, the hierarchical specification information which is already generated and stored is read into the memory from the external storage device 3.

At Step 120, the hierarchical specification information which is added or corrected is returned to the external storage device 3.

At Step 700, to indicate items which can be inferred as a key item at Step 400 of the first embodiment on a priority basis so as to facilitate selection of a user, processing for displaying similar items including many keywords sequentially using a keyword dictionary which enumerates many character strings included in the name of key item beforehand (list of order of included keyword number), for displaying items including many comparison relationship numbers among the similar items sequentially (list of order of comparison relationship number), and for displaying items in the descending order of the sum of the number of included keywords and the number of comparison relationships by the aforementioned two methods (list of order of keyword+comparison relationship) is added.

FIG. 17 is a flow chart showing the detailed processing procedure at Step 700. FIG. 18 shows an example of a keyword dictionary and FIG. 19 shows a display example of the similar item list displayed on the output device 5. Step 700 will be explained in detail on the basis of the flow chart shown in FIG. 17.

A user is inquired as to which one is to be selected among "order of names", "order of included keywords", "order of comparison relationship numbers", and "order of keywords+comparison relationships" as a display method for the similar item list (Step 710). When "order of names" is designated by the user, a list in which the similar item names are reenumerated in the ascending order is displayed on the output device 5 (Step 720).

When "order of included keywords" is designated by the user, the number of keywords included in the keyword dictionary which stores many character strings included in the name of key item in the external storage device 3 or the memory beforehand, which are included in the name of data item in relation to each similar item in the similar item information, is counted (Step 730). Next, a list in which the similar item names are enumerated in the descending order of the counted included keyword numbers is displayed on the output device 5 (Step 740).

When "order of comparison relationship numbers" is designated by the user, the number of comparison relationships is counted for each similar item in the similar item information (Step 750). Next, a list in which the similar item names are enumerated in the descending order of the counted comparison relationship numbers is displayed on the output device 5 (Step 760).

When "order of keywords+comparison relationships" is designated by the user, the number of keywords in the keyword dictionary which are included in the name of data item in relation to each similar item in the similar item information is counted (Step 770). The number of comparison relationships is counted for each similar item in the similar item information (Step 780). Next, a list in which the similar item names are enumerated in the descending order of the sum of the counted included keyword numbers and the counted comparison relationship numbers is displayed on the output device 5 (Step 790).

The user selects an optional item from the list displayed at one of the aforementioned Steps 720, 740, 760, and 790 and similar items having the selected similar item name are searched and obtained from the similar item information (Step 795). Processing corresponding to Yes when the user selects an item or No when the user selects no item is executed.

For example, an inquiry menu "order of names, order of included keywords, order of comparison relationship numbers, order of keywords+comparison relationships" is displayed on the output device 5 and the user is inquired about the display method for the similar item list. When "order of names" is designated by the user, a list in which the similar item names shown in FIG. 8 are reenumerated in the ascending order of the names is displayed on the output device 5.

When "order of included keywords" is designated by the user, the number of keywords in the keyword dictionary 54 which are included in the name of data item in the data item column for each data item shown in FIG. 8 is counted. For example, the data item shown in the data item column of the serial No. 5 is represented by the name of data item for explanation and the name of the data item "slip-NO" includes the keyword "NO" of the serial No. 2 shown in FIG. 18, so that 1 is added to the number of included keywords of the similar item of the serial No. 5. A list in which the similar item names are enumerated in the descending order of the counted included keyword numbers is displayed on the output device 5 as a list of order of included keyword number 57 having a similar item name column 58 and an included keyword number column 59 as shown in FIG. 19.

When "order of comparison relationship numbers" is designated by the user, the number of comparison relationships which is stored in the comparison relationship column 35 is counted for each similar item shown in FIG. 8. For the similar item of the serial No. 5, the comparison relationship in the comparison relationship column 35 is 2. A list in which the similar item names are enumerated in the descending order of the counted comparison relationship numbers is displayed on the output device 5 as a list of order of comparison relationship number 60 having a similar item name column 61 and a comparison relationship number column 62 as shown in FIG. 19.

When "order of keywords+comparison relationships" is designated by the user, a list in which the similar item names are enumerated in the descending order of the sum of the counted results of the included keyword numbers and the comparison relationship numbers is displayed on the output device 5 as a list of keyword+comparison relationship 63 having a similar item name column 64 and a keyword+ comparison relationship column 65. For example, in the example shown in FIG. 19, the counted result of the "client-NO" of the list of order of included keyword number column 57 is 8, and the counted result of "client-NO" of the list of order of comparison relationship number column 60 is 5, and the counted result of "client-NO" of the list of order of keyword+comparison relationship column 63 is 13.

At Step 800 shown in FIG. 16, to make it possible to generate a new hierarchical specification in relation to the existing hierarchical specification using the same key item as that of the generated hierarchical specification at Step 500 of the first embodiment, whether a hierarchical specification having the selected key item exists or not is searched. When a hierarchical specification exists, processing for generating a new hierarchical specification at the upper or lower of the existing hierarchical specification in relation to the existing hierarchical specification is added.

Figure 20:
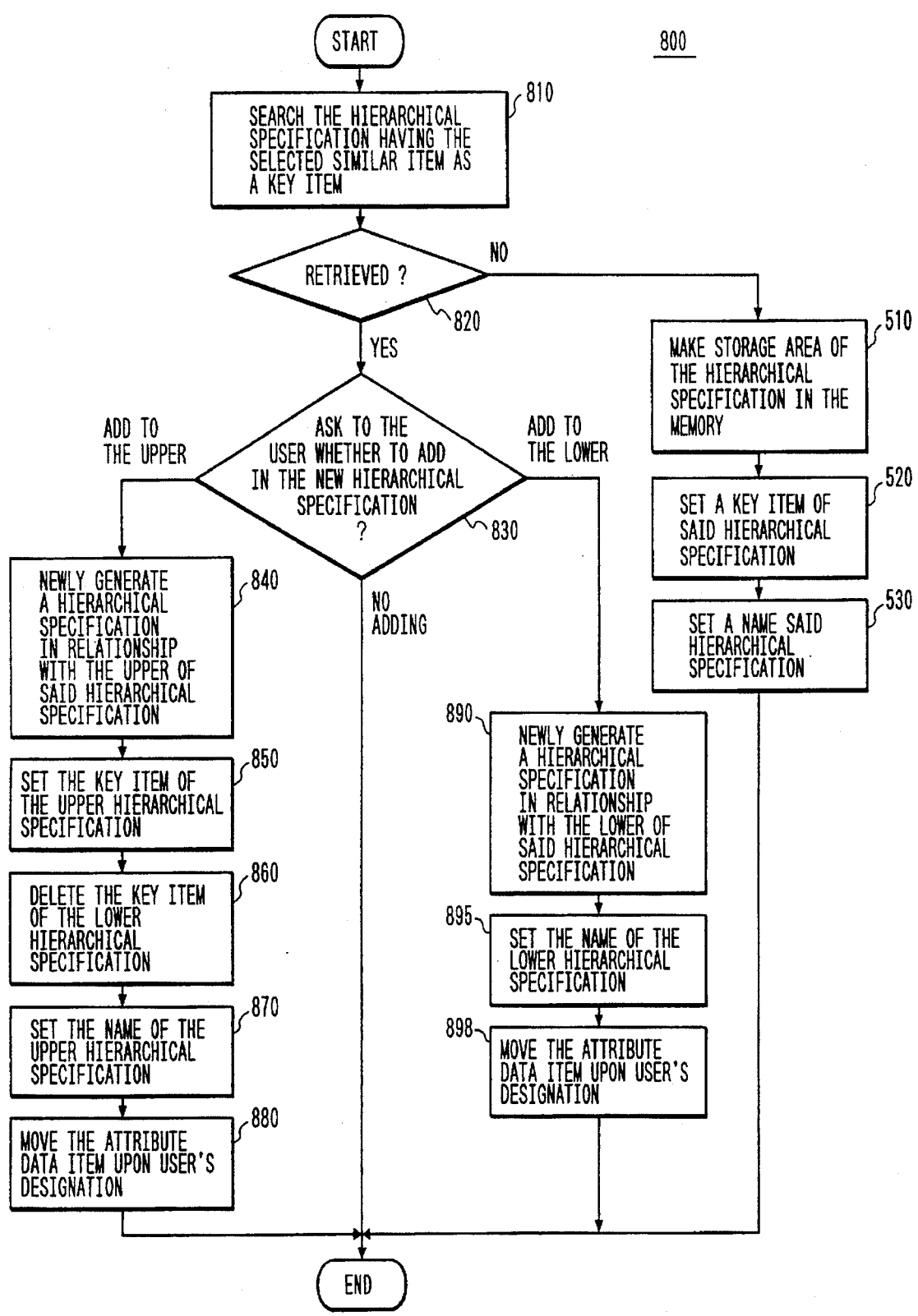
FIG. 20 is a flow chart for generating an additional hierarchical specification.

FIG. 20 is a flow chart showing the detailed processing procedure at Step 800 and FIG. 21 shows an example of a hierarchical specification 66 which is newly generated in relation to the upper of an existing hierarchical specification. The hierarchical specification 66 consists of a serial NO column 67, a name column 68, a key item column 69, an attribute data item column 70, a service procedure column 71, and an upper serial NO column 72. FIG. 22 shows an example of a hierarchical specification 73 which is newly generated in relation to the lower of an existing hierarchical specification. The hierarchical specification 73 consists of a serial NO column 74, a name column 75, a key item column 76, an attribute data item column 77, a service procedure column 78, and an upper serial NO column 79.

Step 800 will be explained in detail on the basis of the flow chart shown in FIG. 20.

A hierarchical specification which has the similar item obtained at Step 700 as a key item is searched from the hierarchical specification information (Step 810). When no hierarchical specification is detected (Step 820), a new hierarchical specification is generated by the same processing procedure as that at Step 500 shown in the first embodiment and the similar item obtained at Step 700 is stored as a key item (Steps 510, 520, 530). When a hierarchical specification which has the similar item obtained at Step 700 as a key item is detected (Step 820), the user is inquired as to which one is the new hierarchical specification, "new generation at the upper", "new generation at the lower", or "no new generation" (Step 830). When "new generation at the upper" is designated by the user, a hierarchical specification is newly generated in relation to the upper of the hierarchical specification (Step 840).

Next, the similar item which is obtained at Step 700 is stored in the key item of the upper hierarchical specification (Step 850). As to the relationship between the upper and lower of the hierarchical specification, the lower hierarchical specification inherits all the information of the upper hierarchical specification, so that the similar item stored in the key item of the hierarchical specification which is a lower hierarchical specification is deleted (Step 860). The hierarchical specification having the relationship between the upper and lower which is generated at Steps 840, 850, and 860 is displayed on the output device 5, and the user inputs the name of the upper hierarchical specification from the I/O device 4, and the inputted name is stored as a name of the upper hierarchical specification (Step 870). When the hierarchical specification is newly added, an optional attribute data item and service procedure are moved to the new hierarchical specification by a command of the user. In the movement processing, an optional attribute data item included in the hierarchical specification which is displayed on the output device 5 at Step 870 is selected by the user and the attribute data item selected by the movement command, the service procedure in which the attribute data item is a creation destination, and the service procedure in which the attribute data item is a reference source are moved to the newly generated hierarchical specification (Step 880).

When "new generation at the lower" is designated by the user at Step 830, a hierarchical specification is newly generated in relation to the lower of the hierarchical specification (Step 890). Next, the hierarchical specification having the relationship between the upper and lower is displayed on the output device and the name of the lower hierarchical specification which is inputted from the I/O device by the user is stored as a name of the lower hierarchical specification (Step 895). By the same processing as that at Step 880, an optional attribute data item and service procedure are moved to the new hierarchical specification (Step 898).

When "no new generation" is designated by the user at Step 830, no processing is executed.

For example, a hierarchical specification which has the similar item "order-reception-NO" obtained at Step 700 as a key item is searched from the hierarchical specification information 40 shown in FIG. 11 (Step 810). If the aforementioned hierarchical specification is not detected, according to the same processing procedure as that at Step 500 shown in the first embodiment, a new hierarchical specification having the similar item "order-reception NO" as a key item is generated (Steps 510, 520, 530).

As indicated by the serial No. 2 shown in FIG. 11, when a hierarchical specification having the similar item "order-reception NO" as a key item is detected, the user is inquired as to which one is used so as to generate a new hierarchical specification, "new generation at the upper", "new generation at the lower", or "no new generation" of the hierarchical specification indicated by the serial No. 2 (Step 830). When "new generation at the upper" is designated by the user, a hierarchical specification is newly generated, for example, as a serial No. 3 and the serial No. 3 of the newly generated hierarchical specification is stored in the upper serial NO column 72 of the hierarchical specification indicated by the serial No. 2 (Step 840, see FIG. 21). Next, the similar item "order-reception NO" is stored in the key item column 69 of the hierarchical specification indicated by the serial No. 3 (Step 850). The similar item "order reception NO" which is stored in the key item column 69 of the hierarchical specification indicated by the serial No. 2 of the lower hierarchical specification is deleted (Step 860). The hierarchical specifications indicated by the serial Nos. 2 and 3 are displayed on the output device 5, and the user inputs the name of the upper hierarchical specification from the I/O device 4, and the inputted name is stored in the name column 68 of the hierarchical specification indicated by the serial No. 3 which is the upper hierarchical specification (Step 870). In the example shown in FIG. 21, the inputted name corresponds to the name "order reception" of the serial No. 3.

Next, when an optional attribute data item is selected by a command of the user and movement is instructed, the selected attribute data item and the related service procedure are moved to the newly generated hierarchical specification (Step 880). For example, in the example shown in FIG. 21, as to "unit price of received order" in the attribute data item column of the serial No. 3, the attribute data item of the hierarchical specification of the serial No. 2 is moved by selection and a movement command by the user. Namely, the service procedure "set unit price of received order" in which the attribute data item "unit price of received order" is a creation destination and the service procedure "get unit price of received order" in which the attribute data item "unit price of received order" is a reference source are also moved to the service procedure column 71 of the serial No. 3.

When "new generation at the lower" is designated by the user at Step 830, as shown in FIG. 22, a hierarchical specification is newly generated, for example, as a serial No. 3 and the serial No. 2 is stored in the upper serial NO column (Step 890). Next, the hierarchical specifications indicated by the serial Nos. 2 and 3 are displayed on the output device, and the user inputs the name of the lower hierarchical specification from the I/O device, and the inputted name is stored in the name column of the hierarchical specification indicated by the serial No. 3 which is the lower hierarchical specification (Step 895). In the example shown in FIG. 22, the inputted name corresponds to the name "general order reception" of the serial No. 3.

According to the present invention, when specification information including data items mainly is reconstructed on the basis of already-developed software, an item which is a key for the specification information is selected, so that by indicating items which can be inferred as a key item on a priority basis by using the order of names, the order of included keywords, the order of comparison relationship numbers, or the order of keywords plus comparison relationships, selection of the user becomes easy and when a same key having a different specification information (derivative information of the existing specification information or specification information which becomes an upper concept) is added to a hierarchical specification which is stored in a library, there is no need for the inventor to know fully the specification information which is stored in a library beforehand, accordingly the productivity of reconstruction of the specification information is improved effectively.

Figure 23:
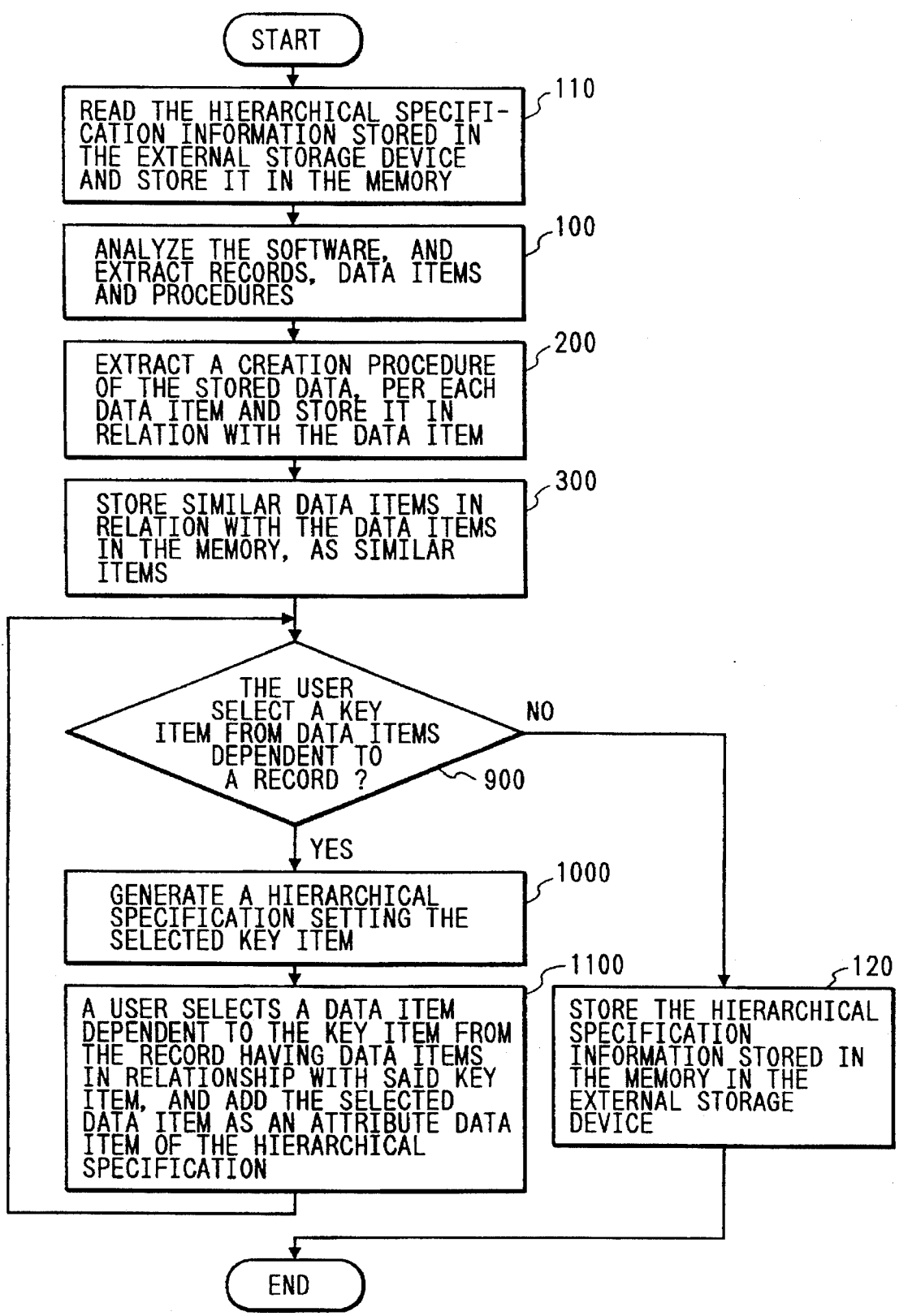
FIG. 23 is a flow chart of the third embodiment of the present invention.

FIG. 23 is a flow chart showing the processing procedure of the third embodiment of the present invention. In this embodiment, the steps indicated below are added to the flow chart shown in FIG. 16 of the second embodiment. (1) In the method for key item selection by a user shown at Step 700, a record of existing software closely to business processing is indicated to the user and key items are recognized from the relationship with other data items included in the record, so that the user can select them easily. (2) In generation of a new hierarchical specification at Step 800, when the selected key items are partially duplicated with the key items of the generated hierarchical specification, a new hierarchical specification is generated in relation to the existing hierarchical specification using the unduplicated key items. (3) When the key items of the newly generated hierarchical specification are used as attribute data items of another hierarchical specification already or there is a hierarchical specification having the newly added attribute data items as key items already, the attribute data items are changed so as to store them in relation to the hierarchical specification having the related key items. The processing procedure of this embodiment is almost the same as that of the second embodiment, though Step 700 is changed to Step 900, Step 800 to Step 1000, and Step 600 to Step 1100 respectively. The other steps are the same as those of the second embodiment.

At Step 900, the Step 700 of the second embodiment is changed so that a record of existing software which is close to business processing is indicated to the user and key items can be identified and selected from the relationship with other data items and the step is changed so that when a list of records and a content of record are displayed on the output device 5 and the user selects an item which becomes a key, the corresponding similar items are obtained.

Figure 24:
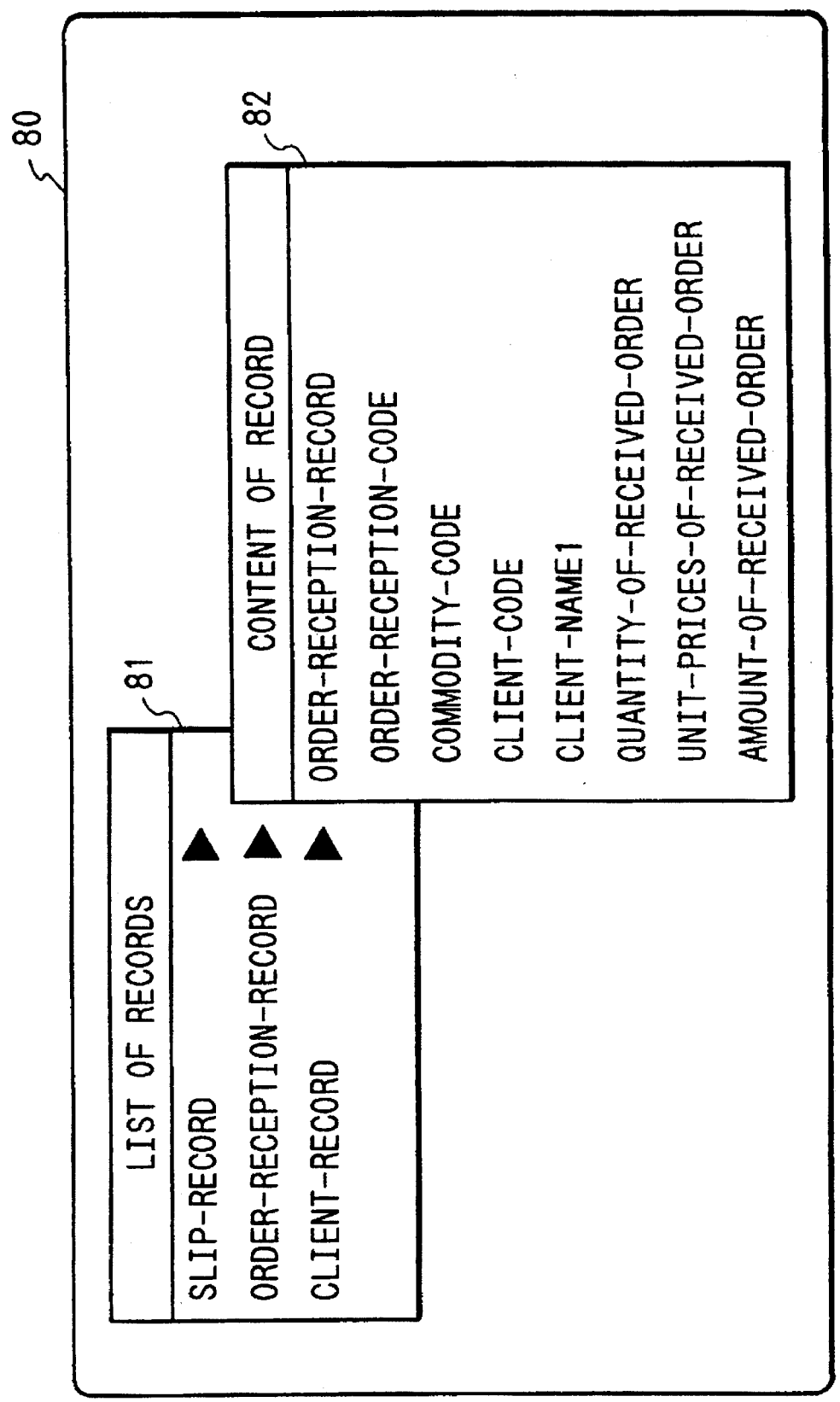
FIG. 24 is a drawing showing a record list and record contents.

FIG. 24 shows an example that a list of records 81 and a content of record 82 are displayed on the output device 5. Data items for "record" in the attribute column 15 in the analysis information of data definition division 11 are searched and a list of names of the detected data items is displayed on the output device 5. Data items having the name of record selected by the user in the name column are searched from the analysis information of data definition division, and data items dependent on the data items indicating the detected records are enumerated from the detected data items in the ascending order of serial Nos., and a list of data item names until the next data item attribute column becomes "record" is displayed on the output device 5. A method for obtaining the corresponding similar items from the name of data item selected by the user is shown in the first embodiment.

For example, in the analysis information of data definition division 11 shown in FIG. 5, data items for "record" in the attribute column 15 are searched. In the example shown in FIG. 5, the serial Nos. 10, 18, and 26 are detected and a list of the data item names "slip-record", "order-reception-record", and "client-record" is displayed on the output device 5 (see "list of records" 81 shown in FIG. 24). When the user selects, for example, "order-reception-record", a data item having the name "order-reception-record" in the name column is searched from the analysis information of data definition division 11 shown in FIG. 5. In the example shown in FIG. 5, the serial No. 18 is detected and data items for "record" in the attribute column are searched from the data item indicated by the serial No. 18 in the ascending order of serial Nos. In the example shown in FIG. 5, the data item "client-record" of the serial No. 26 is detected and a list of names of data items from the serial No. 18 to the serial No. 25 which is just prior to the serial No. 26 is displayed on the output device 5 as "content of record" 82 shown in FIG. 24.

At Step 1000, the following steps are added to Step 800 of the second embodiment. (1) When the selected key items are partially duplicated with the key items of the generated hierarchical specification or when there is a hierarchical specification in which the selected key items are partially duplicated with the key items thereof already so as to generate a new hierarchical specification in relation to the existing hierarchical specification using unduplicated key items, a new hierarchical specification is generated at the upper or lower of the existing hierarchical specification in relation to the existing hierarchical specification according to the duplicated items. (2) When the key item of the newly generated hierarchical specification is used in the attribute data item of another hierarchical specification, to prevent the attribute data item from being duplicatedly stored in a plurality of hierarchical specifications, the attribute data item is stored in relation to a hierarchical specification having the related key item.

Figure 25:
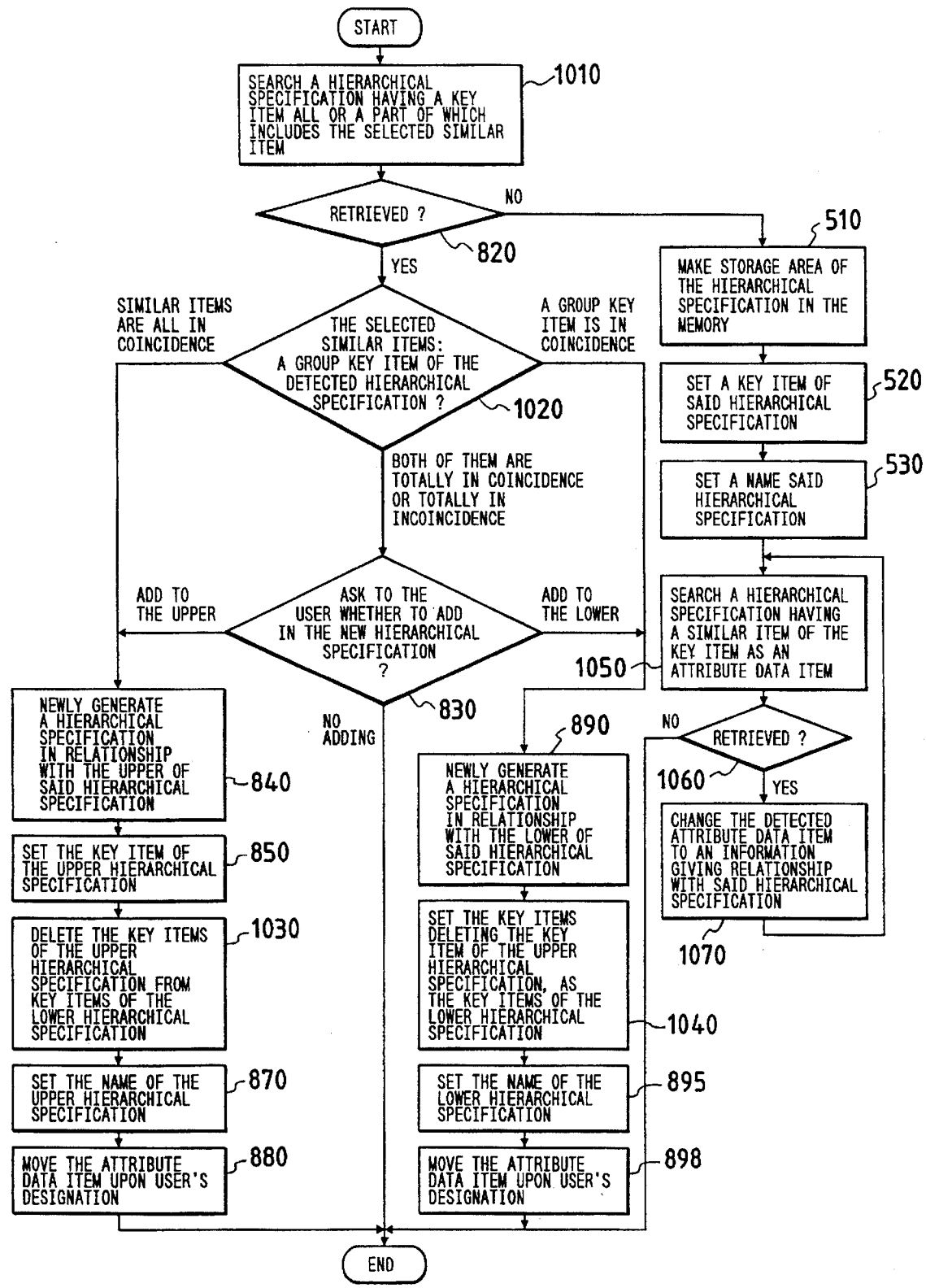
FIG. 25 is a flow chart for generating an additional hierarchical specification.
Figure 26:
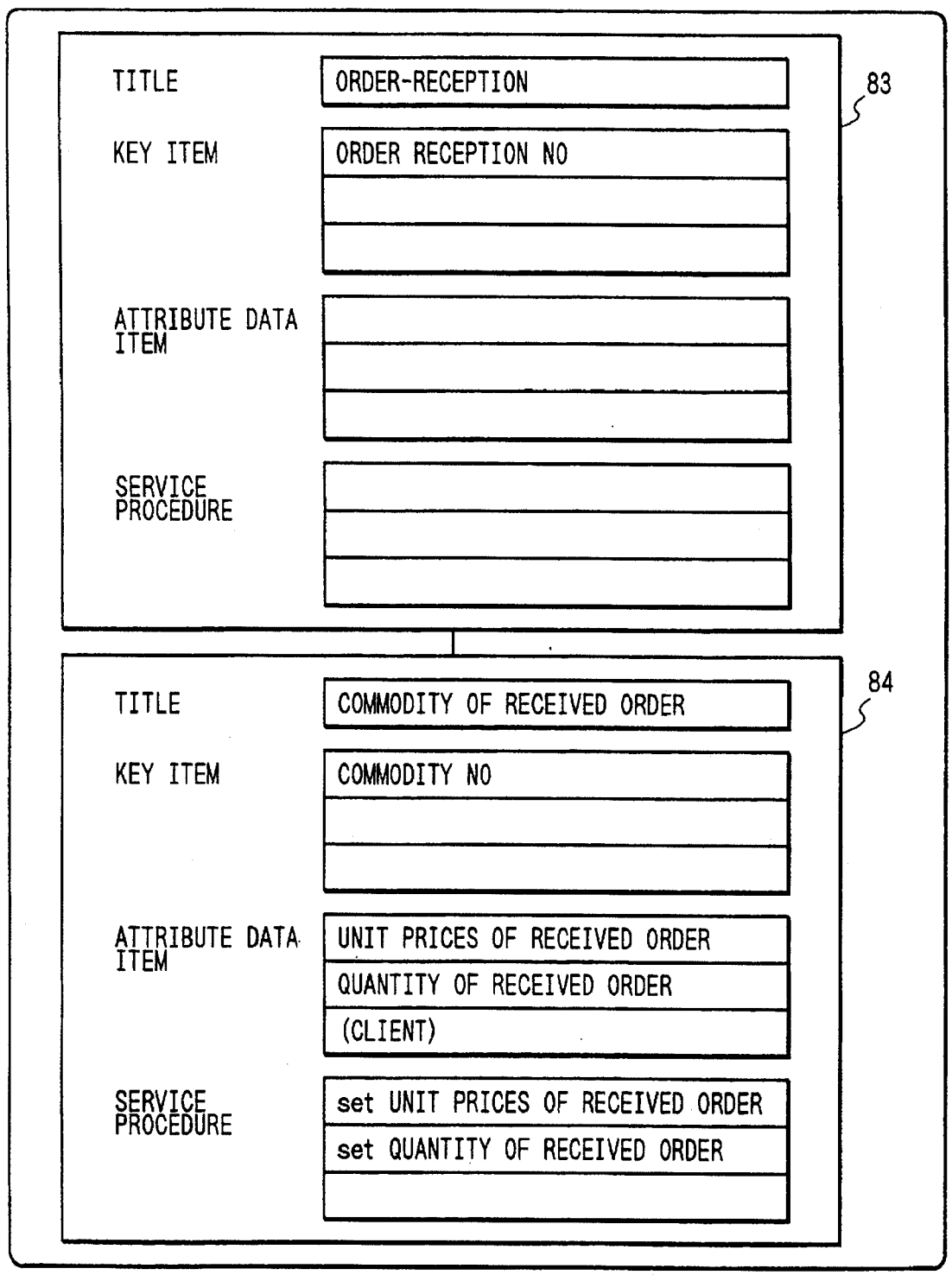
FIG. 26 is a drawing showing an example of a display of hierarchical specification information added to the lower.

FIG. 25 is a flow chart showing the detailed processing procedure at Step 1000. FIG. 26 shows an example that a hierarchical specification which is newly generated in relation to the upper of an existing hierarchical specification is outputted on the output device 5 and FIG. 27 shows a hierarchical specification 85 related to another hierarchical specification. The hierarchical specification 85 consists of a serial NO column 86, a name column 87, a key item column 88, an attribute data item column 89, a service procedure column 90, and an upper serial NO column 91. FIG. 28 shows an example that service procedure informations 92 and 96 are displayed on the output device 5. Step 1000 will be explained in detail using the flow chart shown in FIG. 25. Particularly, an additional part to the processing procedure at Step 800 of the second embodiment will be explained (for the same step numbers as those shown in FIG. 20, see the explanation shown in FIG. 20).

In the following explanation, the group key items are the key items of the part above an aimed item among the whole hierarchical specification.

A hierarchical specification is searched from the hierarchical specification information so that at least one similar item (hereinafter called similar items) obtained at Step 900 are a part of the group key items or the group key items are a part of the similar items (Step 1010). When the aforementioned hierarchical specification is detected (Step 820), a coincidence test is carried out between the similar items and group key items as shown below. Coincidence between the similar items in the similar item group and the group key items is tested. When the test result shows that all the similar items in the group key items are in coincidence and there are incoincident similar items among the similar items of the similar item group, a hierarchical specification having the incoincident similar items as a key is generated in relation to the lower of the hierarchical specification (Step 890). When all the similar items in the similar key group are in coincidence and there are incoincident similar items among the similar items of the group key items, a hierarchical specification having the similar items as a key item is generated in relation to the upper of the hierarchical specification (Step 840). When there are incoincident similar items in both the similar items and the group key items or the similar items in both of them are totally in coincidence, the user is inquired (Step 830).

At Step 1030, the similar items included in the key items of the upper hierarchical specification are deleted from the key items of the lower hierarchical specification so as to eliminate duplication of key items.

For the same reason, at Step 1040, key items obtained by deleting the key items of the upper hierarchical specification are set as key items of the lower hierarchical specification, that is, the incoincident similar items obtained from the test result at Step 1020 are stored in the key item column of the lower hierarchical specification. For example, when the user selects "order-reception-code, commodity code" as a key from the content of record shown in FIG. 24, a hierarchical specification which is coincident with the corresponding similar items "order reception NO, commodity NO" is searched, for example, from the hierarchical specification information shown in FIG. 11 (Step 1010). In the example shown in FIG. 24, the similar items indicate "order reception NO, commodity NO" and the group key item indicates "order reception NO". When there are upper serial Nos., the key items of the upper hierarchical specification are collected sequentially so as to create a collection of key items. Coincidence of "order reception NO, commodity NO" with "order reception NO" is tested. In the example, all "order reception NOs" of the group key item are in coincidence with each other and "commodity NO" remains in the similar items as an incoincident similar item. As a result, a new hierarchical specification is generated at the lower of the hierarchical specification indicated by the serial No. (Step 890, hierarchical specification indicated by the serial No. 3 shown in FIG. 27). In a key item column 88, "commodity NO" which becomes an incoincident similar item is stored (Step 1040).

FIG. 26 shows an example that hierarchical specifications in the hierarchical relation are displayed on the output device. In the drawing, an upper hierarchical specification 83 is displayed in the upper row and a lower hierarchical specification 84 is displayed in the lower row and the hierarchical specifications are connected to each other with a solid line so as to be related to each other.

When the corresponding existing hierarchical specification cannot be detected as a result of searching at Step 1010, a new hierarchical specification is generated (see Steps 510, 520, and 530 shown in FIG. 10). A hierarchical specification which has the similar item related to the key item of the generated hierarchical specification in the attribute data item column is searched from the hierarchical specification information (Step 1050). When the aforementioned hierarchical specification is detected (Step 1060), the attribute data corresponding to the detected hierarchical specification is changed to the information related to the hierarchical specification generated at the aforementioned step. The related information can be realized, for example, by the serial No. of the hierarchical specification and an identifier for indicating that the serial No. is the serial No. of the hierarchical specification (Step 1070).

For example, the hierarchical specification indicated by the serial No. 5 shown in FIG. 27 is a hierarchical specification which is newly generated and the similar item "client-NO" is stored in the key item column 88. In the hierarchical specification of the serial No. 3, the attribute data item indicated by a reference code 2701 is the similar item "client-NO" at first and since the hierarchical specification indicated by the serial No. 5 is newly generated, a hierarchical specification having the similar item "client-NO" related to the key item in the attribute data item column 89 is searched from the hierarchical specification information and an attribute data item 2701 corresponding to the detected hierarchical specification indicated by the serial No. 3 is changed from "client-NO" to information "(client)" related to the hierarchical specification.

Service procedure information 92 related to the attribute data item shown in FIG. 28 is also changed to information "(client)" related to the hierarchical specification as shown in a content of procedure column 95 for the service procedure name "get client".

Step 1100 shown in FIG. 23 is a step that processing for storing information which relates a similar item to a hierarchical specification having a key item in the attribute data item so as to prevent the key item and attribute data item from being stored duplicatedly in a plurality of hierarchical specifications when the similar item to be added to the attribute data item is already used as a key item of another hierarchical specification is added to Step 600 of the first embodiment.

Figure 29:
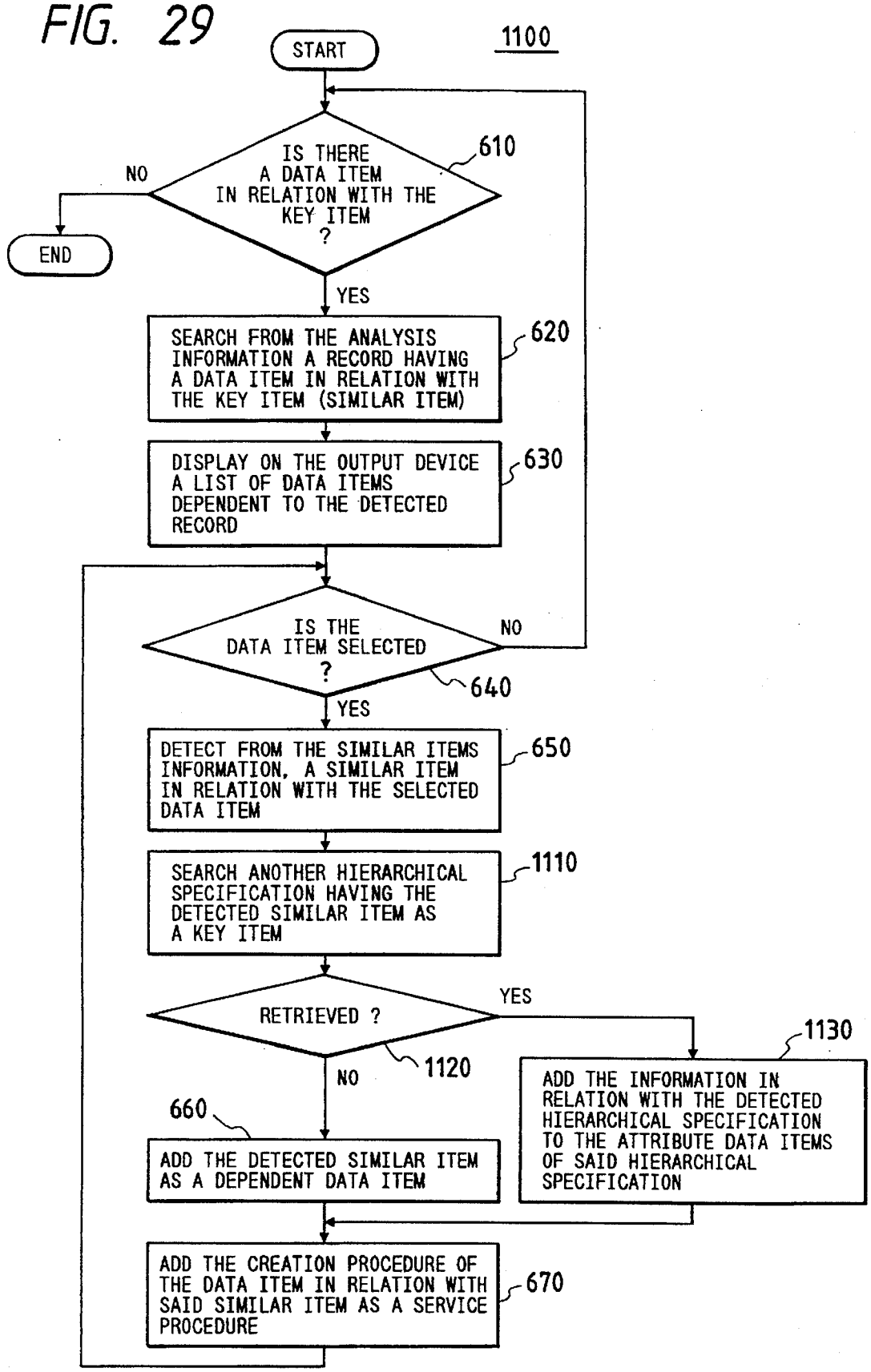
FIG. 29 is a flow chart for generating an attribute data item.

FIG. 29 is a flow chart showing the detailed processing procedure at Step 1100.

Step 1100 will be explained according to the processing procedure shown in FIG. 29. Particularly, the part added to the processing procedure (see FIG. 13) shown at Step 600 will be explained.

A hierarchical specification having the similar item to be added to the attribute data item which is selected and detected by the user in the key item column is searched from the hierarchical specification information (Step 1110). When the aforementioned hierarchical specification is detected (Step 1120), the information related to the detected hierarchical specification is added to the attribute data item (Step 1130).

For example, when the similar item "business category code" is added to the hierarchical specification indicated by the serial No. 5 shown in FIG. 27 as an attribute data item, a hierarchical specification having the similar item "business category code" in the key item column 88 is searched. In the example shown in FIG. 27, the hierarchical specification "business category" indicated by the serial No. 4 is detected and the information "(business category)" related to the hierarchical specification is added as an attribute data item of the hierarchical specification indicated by the serial No. 5. Also as to the service procedure 96 shown in FIG. 28, the reference procedure is added by the information "(business category)" related to the hierarchical specification as shown in the content of procedure column 99 for the service procedure "get business category". According to the present invention, to select an item which is a key of specification information when the specification information having data items mainly is reconstructed from already-developed software, a record of existing software close to business processing is indicated to a user and a key item is identified and selected from the relationship with another data item included in the record. As a result, the selection range is limited and selection of the user becomes easy. Furthermore, the key item and attribute data item are not duplicated and specification informations which are different from each other (derivative information of the existing specification information or specification information which becomes an upper concept) are added to a hierarchical specification which is stored in a library, so that there is no need for the inventor to know fully the specification information which is stored in a library beforehand and the productivity of reconstruction of the specification information is improved.

The present invention has the aforementioned processing procedure, so that it obtains good results indicated below.

The method for generating hierarchical specification information of the present invention has a step for analyzing a program, a step for storing a procedure related to a data item in relation to the data item, a step for storing a similar item, and a step for storing a similar item selected by a user as a key item and an attribute data item, storing a procedure related to the attribute data item as a service procedure, and generating a hierarchical specification consisting of the stored key item, attribute data item, and service procedure. Therefore, data items which are closely related to each other (a collection of attribute data items) and a data item (key item) for identifying them as a collection of another attribute data items can be summarized as a specification. Furthermore, data of alias in already-developed software and an operation which is closely related to data and is for a collection of data which can be identified by a key can be summarized. As result, specification information which lays stress on data mainly and has high reusability is extracted and the productivity of software and the efficiency of maintenance are improved.

Furthermore, the aforementioned high-reusability specification information is generated in relation to the upper or lower of the existing specification information so as to prevent the key items from being duplicated, so that the derivative of specification information can be related hierarchically and extracted and understanding of data for reuse and selection of the reusing position become easy. As a result, the productivity of software and the efficiency of maintenance are improved.

In the similar item selection method for creating attribute data items, a data item of a record related to a key item is indicated, so that a data item which is used simultaneously with the key item in already-developed software also can be selected, and specification information having high actualization is extracted, and the productivity of software and the efficiency of maintenance are improved.

When there is another hierarchical specification including attribute data items in the key items, the attribute data items are changed to information related to the detected hierarchical specification, so that the attribute data items are related to each other among the hierarchical specifications without being duplicated with each other among the hierarchical specifications and specification information in which separation and independence of data are kept is extracted.

By changing the initialization and end procedures among the service procedures related to attribute data items to another service procedures, specification information having an operation procedure with higher actualization is extracted and the productivity of software and the efficiency of maintenance are improved.

In the method for generating hierarchical specification information of the present invention, data items sharing the used area or data items which move data are stored as similar items in relation to each other, so that data items of alias are collected. Furthermore, data items which are an object of a comparison procedure are stored in relation to each other, so that collection of data items handling similar data is easy and the consistency of information handled by development of software and maintenance is kept.

When a similar item is specified, by one of selection from a list of data items, interactive selection from a list of records, selection from a list of similar items which is created in the descending order of the number of included words in the keyword dictionary, selection from a list of similar items which is created in the descending order of the number of comparison relationships in the similar items, and selection from a list of similar items which is created in the descending order of the sum of the counted number of included words in the keyword dictionary for each similar item and the counted number of comparison relationships in the similar items, generation of hierarchical specification information becomes easy.

In the method for generating hierarchical specification information of the present invention, a hierarchical specification is added in relation to the generated hierarchical specification information, so that the hierarchical specification information can be extended simply and the portability and extensibility of information handled by development of software and maintenance are improved.

As mentioned above, according to the present invention, the derivative of data is related hierarchically from already-developed software and hierarchical specification information in which the reusability of stored data is high is extracted together with the related procedure, so that the productivity of software and the efficiency of maintenance are improved.

The invention claimed is:

1. A method for generating hierarchical specification information from software by using a processing device, comprising;

a first step for analyzing at least one program;

a second step of extracting procedure information which creates a value for at least one data item included in the program from the analyzed information and storing it in relation to the data item;

a third step of storing data items sharing a used area or data items which transfer data as similar items by relating them to each other;

a fourth step of storing at least one similar item for identifying another hierarchical specification as a key item; and, a fifth step of storing another similar item as an attribute data item, storing a creation procedure for the data item related to said similar item or a service procedure which is a reference procedure, and generating a hierarchical specification consisting of said stored key item, said attribute data item, and said service procedure.

2. A method for generating hierarchical specification information according to claim 1, wherein the information stored as said similar item in said fourth step includes information giving a relationship between data items to be compared in a comparison procedure.

3. A method for generating hierarchical specification information according to claim 1, wherein said similar item at said fourth step is obtained by detecting a similar item related to a specific data item in listed data items.

4. A method for generating hierarchical specification information according to claim 1, wherein said similar item at said fourth step is obtained by detecting a similar item related to a specific data item dependent on a specific record among records which are indicated as a collection of listed data items.

5. A method for generating hierarchical specification information according to claim 1, wherein said similar item at said fourth step is obtained by creating the data item related to the similar item, which is obtained by counting included words in a keyword dictionary which is stored in a memory beforehand for each similar item, indicating a list of similar items which is created in a descending order of the counted words, and selecting from the list, in a name character string.

6. A method for generating hierarchical specification information according to claim 1, wherein said similar item at said fourth step is obtained by selecting from a list of similar items which is created in a descending order of a counted number of comparison relationships in the similar items.

7. A method for generating hierarchical specification information according to claim 1, wherein said similar item at said fourth step is obtained by creating the data item related to the similar item, which is obtained by selecting from a list of similar items created in a descending order of a sum of a counted number of included words in a keyword dictionary which is stored in a memory beforehand for each similar item and a counted number of comparison relationships in the similar items, in a name character string.

8. A method for generating hierarchical specification information according to claim 1, wherein at said fourth step, a new hierarchical specification is generated in relation to an upper level or a lower level of an existing hierarchical specification.

9. A method for generating hierarchical specification information according to claim 8, further comprising;

a step of generating a new hierarchical specification having only similar items, which are not duplicated with the key items including the upper level hierarchical specification of the existing hierarchical specification among the similar items selected in relation to the lower level of said hierarchical specification, as key items when similar items selected for key items are a part of the key items including the upper level hierarchical specification of said hierarchical specification.

10. A method for generating hierarchical specification information according to claim 8, further comprising;

a step of deleting selected similar items from the key items of the existing hierarchical specification and generating a new hierarchical specification having the key items which are selected in relation to the upper level of said hierarchical specification as key items when a hierarchical specification having the key items including the upper level hierarchical specification of said hierarchical specification as a part of the similar items selected for the key items is detected.

11. A method for generating hierarchical specification information according to claim 8, further comprising:

a step of generating a new hierarchical specification by relating the similar items having no key items to the lower level of said hierarchical specification based on an inquiry to the user, generating a new hierarchical specification by relating them to the upper level of said hierarchical specification as key items of said hierarchical specification, and deleting the key items of said hierarchical specification when the similar items selected by the user as key items correspond with key items included in the upper level hierarchy in the hierarchical specification or the similar items which do not correspond with any key items remain.

12. A method for generating hierarchical specification information according to claim 1, wherein at said fifth step, when a similar item is selected to create said attribute data item, a similar item related to the data item selected from the data items which are dependent on a record including the data item related to the key item of said hierarchical specification is detected.

13. A method for generating hierarchical specification information according to claim 1, wherein at said fifth step, when said attribute data item is created, another hierarchical specification including said attribute data item in the key item is searched and when said another hierarchical specification is detected, said attribute data item is changed to information related to the detected hierarchical specification.

14. A method for generating hierarchical specification information according to claim 1, wherein at said fifth step, when said service procedures are created, a procedure for initializing data and a procedure for ending data are separated from said service procedures so as to correspond to another service procedure.

15. A method for generating hierarchical specification information according to claim 1, further comprising;
a step of adding a hierarchical specification in relation to a hierarchical specification which is already generated.

* * * * *